United States Patent
Tanizawa et al.

(10) Patent No.: US 7,965,896 B2
(45) Date of Patent: Jun. 21, 2011

(54) METHOD AND APPARATUS FOR ENCODING IMAGE

(75) Inventors: Akiyuki Tanizawa, Kanagawa (JP); Takeshi Chujoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 902 days.

(21) Appl. No.: 11/913,238

(22) PCT Filed: Sep. 21, 2007

(86) PCT No.: PCT/JP2007/069133
§ 371 (c)(1),
(2), (4) Date: Oct. 31, 2007

(87) PCT Pub. No.: WO2008/044511
PCT Pub. Date: Apr. 17, 2008

(65) Prior Publication Data
US 2010/0074518 A1    Mar. 25, 2010

(30) Foreign Application Priority Data
Oct. 12, 2006    (JP) .................. 2006-279323

(51) Int. Cl.
*G06K 9/36*    (2006.01)
(52) U.S. Cl. ......... 382/232; 382/171; 382/173; 382/176
(58) Field of Classification Search .......... 382/232, 382/173, 171, 176; 375/240.03, 240.06, 375/E7.129; 348/699; 725/54; 455/39, 455/67.11
See application file for complete search history.

(56) References Cited

U.S. PATENT DOCUMENTS

| | | | | |
|---|---|---|---|---|
| 5,479,211 A | * | 12/1995 | Fukuda | 375/240.03 |
| 5,613,015 A | | 3/1997 | Suzuki et al. | 382/173 |
| 6,078,689 A | * | 6/2000 | Kunitake et al. | 382/232 |
| 6,748,113 B1 | * | 6/2004 | Kondo et al. | 382/232 |
| 2007/0189626 A1 | | 8/2007 | Tanizawa et al. | 375/240.16 |

FOREIGN PATENT DOCUMENTS

| | | |
|---|---|---|
| JP | 6-164939 | 6/1994 |
| JP | 08-126013 | 5/1996 |
| JP | 2001-169280 | 6/2001 |
| JP | 2002-199398 | 7/2002 |
| JP | 2004-56680 | 2/2004 |
| JP | 2006-60343 | 3/2006 |

OTHER PUBLICATIONS

Chen, et al, "Fast computation of perceptually optimal quantization matrices for MPEG-2 Intra pictures", ICIP, pp. 419-422, Chap. 2, 1998.
Wu, et al., "Rate-constrained picture-adaptive quantization for JPEG baseline coders", ICASP, pp. 389-392, Chap. 3, 1993.
Lee, et al., "Rate-distortion Optimization of Parametrized quantization matrix for MPEG-2 encoding", ICIP, pp. 383-386, Chap. 1, 1998.

* cited by examiner

*Primary Examiner* — Anh Hong Do
(74) *Attorney, Agent, or Firm* — Oblon, Spivak, McClelland, Maier & Neustadt, L.L.P.

(57) ABSTRACT

A value of a selection parameter is sequentially set from among a plurality of parameters included in a modeling equation to derive a quantization matrix. A value of each of the parameters is sequentially derived based on a code amount and an encoding distortion obtained from an encoding using a quantization matrix generated from an updated parameter set.

6 Claims, 18 Drawing Sheets

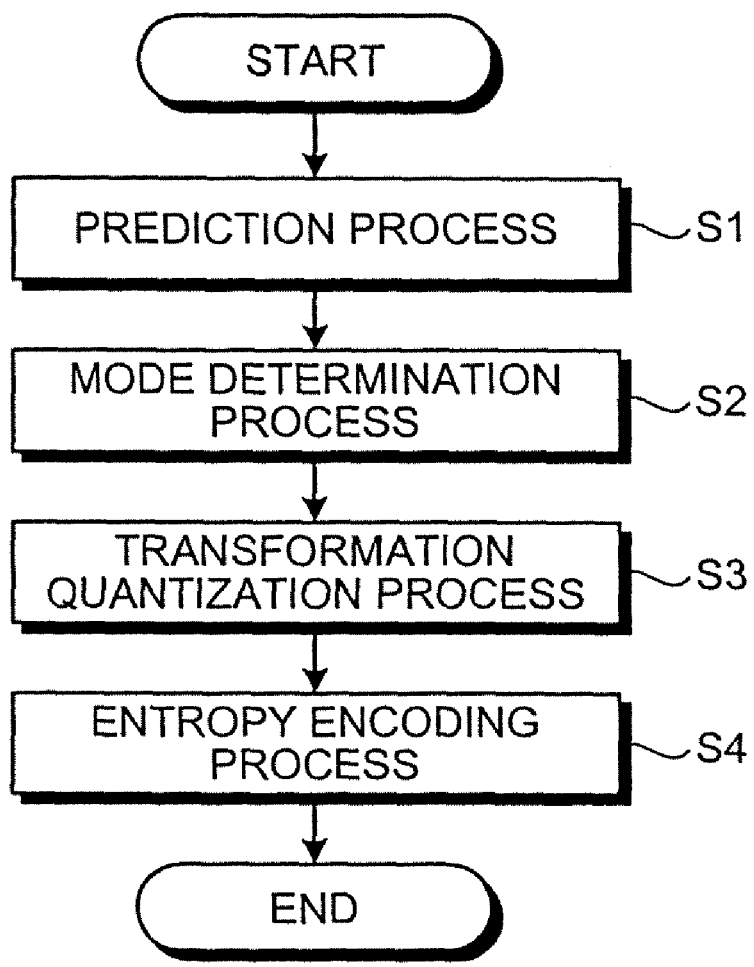

FIG.5A $$Q_{4\times4}(i,j) = \begin{bmatrix} 6 & 12 & 20 & 27 \\ 12 & 20 & 27 & 32 \\ 20 & 27 & 32 & 37 \\ 27 & 32 & 37 & 41 \end{bmatrix}$$

FIG.5B $$Q_{8\times8}(i,j) = \begin{bmatrix} 9 & 13 & 15 & 17 & 19 & 21 & 22 & 24 \\ 13 & 13 & 17 & 19 & 21 & 22 & 24 & 25 \\ 15 & 17 & 19 & 21 & 22 & 24 & 25 & 27 \\ 17 & 19 & 21 & 22 & 24 & 25 & 27 & 28 \\ 19 & 21 & 22 & 24 & 25 & 27 & 28 & 30 \\ 21 & 22 & 24 & 25 & 27 & 28 & 30 & 32 \\ 22 & 24 & 25 & 27 & 28 & 30 & 32 & 33 \\ 24 & 25 & 27 & 28 & 30 & 32 & 33 & 35 \end{bmatrix}$$

| MODELING PARAMETER NAME | FIRST-ROUND SETTING VALUE | SECOND-ROUND SETTING VALUE |
|---|---|---|
| a | 0.0 | 4.0 |
| b | -2.0 | 2.0 |
| c | 10.0 | 20.0 |

METHOD AND APPARATUS FOR ENCODING IMAGE

TECHNICAL FIELD

The present invention relates to an image encoding method, and an image encoding apparatus for quantization and dequantization of an image signal.

BACKGROUND ART

In the ITU Telecommunication Standardization Sector (ITU-T) T.81 and the International Standards Organization (ISO)/International Electrotechnical Commission (IEC) 10918-1 recommended by the ITU-T and the ISO/IEC (hereinafter, "Joint Photographic Experts Group (JPEG)"), a quantization is performed uniformly across an entire frequency domain when performing the quantization (encoding) of transform coefficients on the same quantization scale. In the JPEG, because the human visual feature is relatively insensitive to a high-frequency domain, a coarse quantization is generally performed for a high-frequency component compared with a low-frequency component, by performing a weighting with respect to each frequency domain using a coefficient table called a quantization matrix. The quantization matrix using such human visual feature is designed to minimize an encoding distortion by assuming a distribution of discrete cosine transform (DCT) coefficients as a Laplace distribution.

Even in a conventional video encoding method such as ISO/IEC MPEG-1, 2, 4 and ITU-T H. 261, H. 263, a reduction of a code amount of the transform coefficients is performed by performing the quantization with respect to orthogonal-transformed DCT coefficients. In more recent years, a video encoding method with a greatly improved encoding efficiency has been recommended by the ITU-T and the ISO/IEC as the ITU-T Rec. H. 264 and ISO/IEC 14496-10 (hereinafter, "H. 264"). In the H. 264 high profile, it is configured that a total of eight different quantization matrices can be held with respect to each encoding mode (intra-picture prediction and inter-picture prediction) and each signal (luminance signal and color-difference signal), in association with two types of transform quantization block size (4×4 pixel block and 8×8 pixel block).

Various technologies have been proposed so far to make use of the characteristics of the quantization matrix that the quantization scale can be changed with respect to each frequency position. For instance, a method of designing a quantization matrix taking the visual feature into consideration is proposed in Y. Chen, "Fast Computation of Perceptually Optimal Quantization Matrix for Mpeg-2 Intra Pictures", ICIP-98, pp. 419-422, October 1998. Furthermore, a method of designing a quantization matrix with a high image dependency to improve the encoding efficiency based on an optimization of an encoding distortion D and a code amount R is proposed in S. W. Wu, "Rate-Constrained Picture-Adaptive Quantization for JPEG Baseline Coders", ICASP-93, pp. 389-392, April 1993. In addition, a technology for simplifying a design of a quantization matrix by modeling the quantization matrix is proposed in J. Lee, "Rate-Distortion Optimization of Parameterized Quantization Matrix for MPEG-2 Encoding", ICIP-98, pp. 383-386, October 1998.

However, with the method proposed by Y. Chen, it cannot be said that the quantization matrix is optimally designed from a view point of the encoding efficiency because the actual code amount is not considered in the method, leaving a possibility of performing an inefficient encoding. Furthermore, the method proposed by S. W. Wu is not practically useful because a re-encoding process is required with respect to each frequency position which necessitates a relatively large process cost. In addition, the technology proposed by J. Lee is not practically useful, either, because a massive number of combinations of parameters necessary for the modeling are present which necessitates a relatively large process cost similarly to the method proposed by S. W. Wu.

DISCLOSURE OF INVENTION

According to one aspect of the present invention, an image encoding apparatus includes an image acquiring unit that acquires an image signal; a modeling-parameter setting unit that selects a selection parameter sequentially from among a plurality of parameters included in a modeling equation for deriving a quantization matrix, and sets a value of the selection parameter to a predetermined value; a quantization-matrix calculating unit that calculates the quantization matrix by using the modeling equation for each time the selection parameter is set; a tentative-encoding processing unit that performs a tentative encoding of the image signal by using the quantization matrix, and derives a quantization parameter representing a code amount, an encoding distortion, and a quantization scale; an approximate-expression estimating unit that derives a first approximate expression approximating a relation between the code amount and the selection parameter and a second approximate expression approximating a relation between the encoding distortion and the selection parameter; a code-amount-distortion-expression calculating unit that calculates code-amount-distortion relational expression representing a relation between the code amount and the encoding distortion by using the first approximate expression and the second approximate expression; a target-code-amount calculating unit that calculates a target code amount or a target encoding distortion by using the code-amount-distortion relational expression and the quantization parameter; a modeling-parameter calculating unit that calculates a value of the selection parameter corresponding to the target code amount by using the first approximate expression, or calculates a value of the selection parameter corresponding to the target encoding distortion by using the second approximate expression; and an optimized-quantization-matrix calculating unit that calculates an optimized quantization matrix for encoding the image signal based on the calculated value of the selection parameter and the modeling equation.

According to another aspect of the present invention, an image encoding method includes acquiring an image signal; selecting a selection parameter sequentially from among a plurality of parameters included in a modeling equation for deriving a quantization matrix, and setting a value of the selection parameter to a predetermined value; calculating the quantization matrix by using the modeling equation for each time the selection parameter is set; performing a tentative encoding of the image signal by using the quantization matrix, and deriving a quantization parameter representing a code amount, an encoding distortion, and a quantization scale; deriving a first approximate expression approximating a relation between the code amount and the selection parameter and a second approximate expression approximating a relation between the encoding distortion and the selection parameter; calculating code-amount-distortion relational expression representing a relation between the code amount and the encoding distortion by using the first approximate expression and the second approximate expression; calculating a target code amount or a target encoding distortion by using the code-amount-distortion relational expression and the quantization parameter; calculating a value of the selection parameter corresponding to the target code amount by using the first approximate expression, or calculating a value of the selection parameter corresponding to the target encoding distortion by using the second approximate expression; and calculating an optimized quantization matrix for encoding the image signal based on the calculated value of the selection parameter and the modeling equation.

BRIEF DESCRIPTION OF DRAWINGS

FIG. 3 is a flowchart of a process performed by an encoding processing unit shown in FIG. 2;

FIGS. 5A and 5B are schematic diagrams of examples of a quantization matrix;

BEST MODE(S) FOR CARRYING OUT THE INVENTION

Exemplary embodiments of the present invention are explained in detail below with reference to the accompanying drawings.

Figure 1:
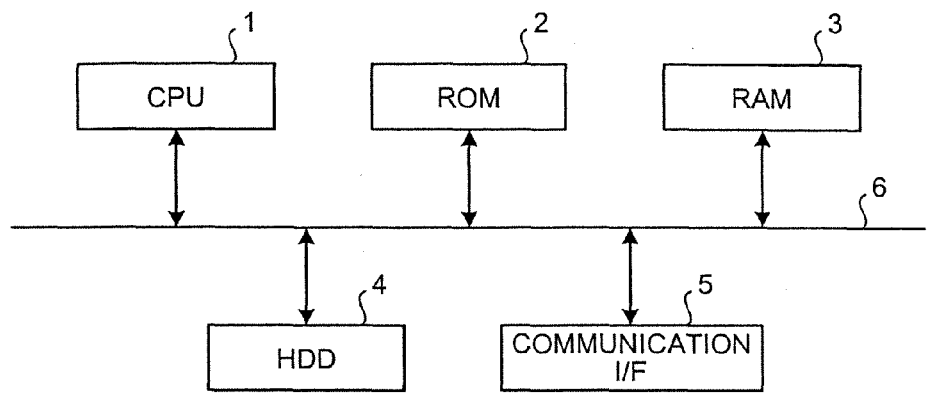
FIG. 1 is a schematic diagram of an image encoding apparatus according to a first embodiment of the present invention.

FIG. 1 is a schematic diagram of an image encoding apparatus 100 according to a first embodiment. As shown in FIG. 1, the image encoding apparatus 100 includes a central processing unit (CPU) 1, a read only memory (ROM) 2, a random access memory (RAM) 3, a hard disk drive (HDD) 4, and a communication interface (I/F) 5, which are connected each other via a bus 6.

The CPU 1 performs an overall control of the components constituting the image encoding apparatus 100 by using a predetermined area of the RAM 3 as a working area and executing various processes (for example, an image encoding process which will be described later) in cooperation with various control programs stored in advance in the ROM 2 and the HDD 4 (hereinafter, collectively referred to as "a storing unit").

The ROM 2 stores therein various programs for controlling the image encoding apparatus 100 and various pieces of setting information in a read-only manner.

The RAM 3 is a storage device such as a synchronous dynamic random access memory (SDRAM), having the nature of storing various data in a rewritable manner. From this nature, the RAM 3 functions as a working area of the CPU 1, playing a role of a buffer and the like.

The HDD 4 includes a magnetically or optically writable recording medium, and stores an image signal input through the communication I/F 5 and encoded data encoded by an encoding processing unit which will be described later (see FIG. 2), various programs for controlling the image encoding apparatus 100 and various pieces of setting information, and the like.

The communication I/F 5 is an interface for performing a communication with an external device such as an image processing apparatus and the like, outputting an image signal input from the external device (hereinafter, referred to as "an input image signal") to the CPU 1. The image signal described here includes a still image and a moving image.

Figure 2:
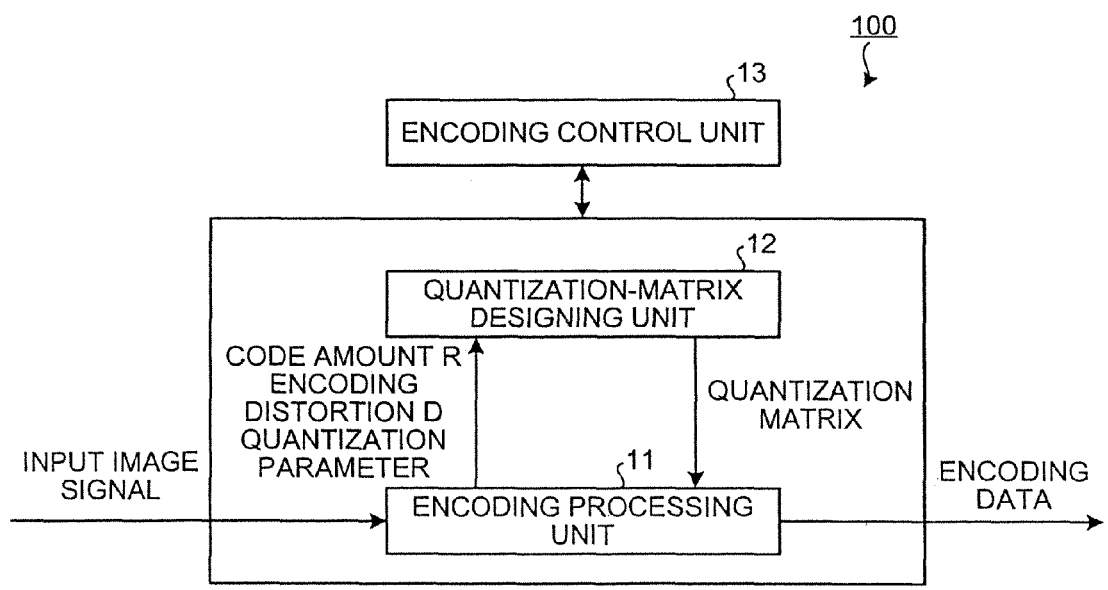
FIG. 2 is a block diagram illustrating a functional configuration of the image encoding apparatus according to the first embodiment.

FIG. 2 is a block diagram illustrating a functional configuration of the image encoding apparatus 100. As shown in FIG. 2, the CPU 1 controls each of the components according to a predetermined program stored in advance in the storing unit so that an encoding processing unit 11, a quantization-matrix designing unit 12, and an encoding control unit 13 are generated in the RAM 3. The input image signal input through the communication I/F 5 is configured to be input to the encoding processing unit 11 at the timing managed by the encoding control unit 13.

The encoding processing unit 11 acquires the input image signal of one frame (encoding frame) that is input through the communication I/F 5, generates encoding data by performing a prediction process S1, a mode determination process S2, a transform quantization process S3, and an entropy encoding process S4 shown in FIG. 3, and outputs the generated encoding data.

At the prediction process 51, a prediction signal for each encoding frame (prediction image) is generated by a method predefined as a prediction mode using a reference image signal on which a decoding process has been already performed. The reference image signal described here indicates a specific pixel located temporally or spatially, which is generated as a local decoding image that will be described later, on which a decoding process has been already performed. As an example of a specific prediction mode, there are an intra-picture (intra-frame) prediction mode in which a prediction is performed using a reference image signal inside an encoding frame only and an inter-picture (inter-frame) prediction mode in which a prediction is performed using reference image signals of temporally different frames. At the prediction process S1, a prediction error signal is further generated, which is a difference between the input image signal and the prediction signal.

At the mode determination process S2, a prediction mode is selected based on the prediction error signal generated at the prediction process S1, which is suitable for an encoding frame to be encoded, from among a plurality of predefined prediction mode candidates. Specifically, at the mode determination process S2, a value of cost K is derived by substituting a difference error SAD that represents an absolute value of a difference error generated at the prediction process S1, i.e., a difference value between a prediction signal and an original image signal (i.e., the input image signal of one frame to be encoded) and a value OH of side information required for a current prediction mode in a cost function of following Equation (1). After that, a validity of the prediction mode is determined based on the value of the cost K. The symbol λ in Equation (1) is a predetermined constant determined according to a value of a quantization parameter corresponding to a quantization scale.

$$K = SAD + \lambda \times OH \quad (1)$$

At the mode determining process S2, values of the cost K derived by the cost function in Equation (1) for each of the prediction modes are compared, and a prediction mode having the smallest value of the cost K is selected as an optimum prediction mode for the encoding frame to be encoded. In general, the optimum prediction mode is different according to a property of a pixel block included in the encoding frame. Therefore, by selecting a suitable prediction mode according to the property of each of the encoding frames like the present embodiment, it is possible to obtain a high encoding efficiency.

Although the validity of the prediction mode is determined using the difference error SAD and the value OH of the side information according to the present embodiment, the present invention is not limited to this scheme. For instance, the validity of the prediction mode can be determined using either one of the difference error SAD or the value OH of the side information only, or based on a cost K derived from a cost function generated using a quantization scale. In addition, the validity of the prediction mode can be determined using a value obtained from a Hadamard transform of the above values or from an approximation. Furthermore, the cost function can be generated using an activity of the input image signal or using the quantization scale.

In addition, as for another embodiment, after performing a tentative encoding of the encoding frame with a specific prediction mode, the validity of the prediction mode can be determined using a squared error between the input image signal and a local decoding image obtained by local decoding a code amount and a transform coefficient at the time of the tentative encoding. A mode determination equation in this case can be represented as following Equation (2).

$$J = D + \lambda \times R \quad (2)$$

In Equation (2), D is an encoding distortion representing the squared error between the input image signal and the local decoding image signal, and R is a code amount estimated by the tentative encoding. At the mode determination process S2, a prediction mode having the smallest cost J, which is derived from Equation (2) according to each prediction mode, is selected as the optimum prediction mode. In the present example, because an entropy encoding and a local decoding (including a dequantization process and an inverse transform process) are performed for each encoding mode, it is possible to employ accurate code amount and encoding distortion, making it possible to keep the encoding efficiency high. In addition, the cost function represented by Equation (2) can be determined using either the encoding distortion D or the code amount R only, or using a value obtained by approximating the encoding distortion D and the code amount R.

At the transform quantization process S3, an orthogonal transform (for example, a discrete cosine transform and the like) is performed on a difference value between a prediction signal generated at the prediction process S1 and the input image signal. Furthermore, at the transform quantization process S3, a quantization process is performed with respect to the difference value that is orthogonal transformed (hereinafter, referred to as "a transform coefficient"), using a quantization matrix that will be described later (optimized quantization matrix). In addition, at the transform quantization process S3, it is configure that a dequantization process and an inverse transform process for generating a local decoding image signal are also performed. At the dequantization process, the transform coefficient that is quantized is dequantized, and at the inverse transform process, the dequantized transform coefficient is inverse transformed, so that the difference value is derived. Thereafter, the derived difference value is added to a prediction signal, to generate the local decoding image signal. The local decoding image signal generated in the above manner is supposed to be used as the reference image signal for performing the prediction process S1.

At the entropy encoding process S4, an entropy encoding (for example, Huffman coding, arithmetic coding, and the like) is performed by an entropy encoding process with respect to the quantized transform coefficient.

In the encoding processing unit 11, the code amount R at the time of completing the encoding at the entropy encoding process S4 is calculated, and the squared error between the local decoding image signal and the input image signal is calculated as the encoding distortion D. Then, the encoding processing unit 1 outputs a quantization parameter indicating a quantization scale and the like at the time of performing the quantization process as well as the code amount R and the encoding distortion D to the quantization-matrix designing unit 12.

Figure 4A:
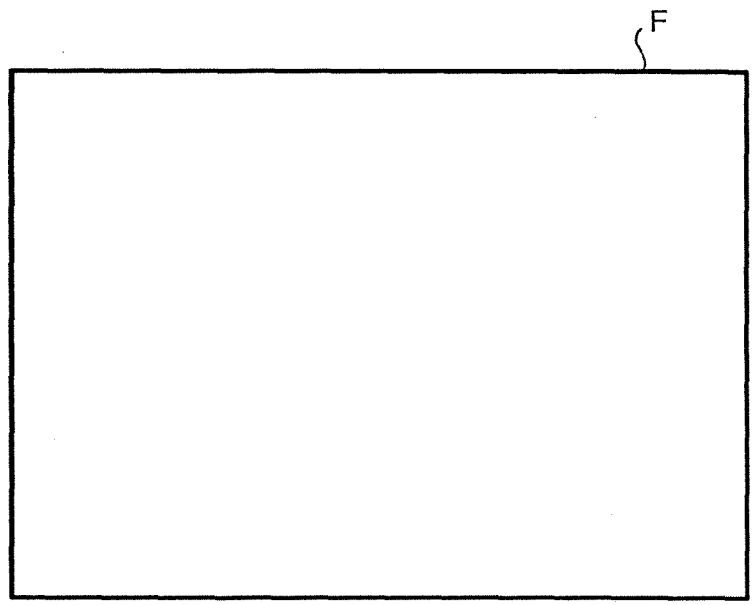
FIG. 4A is a schematic diagram of an encoding frame.
Figure 4B:
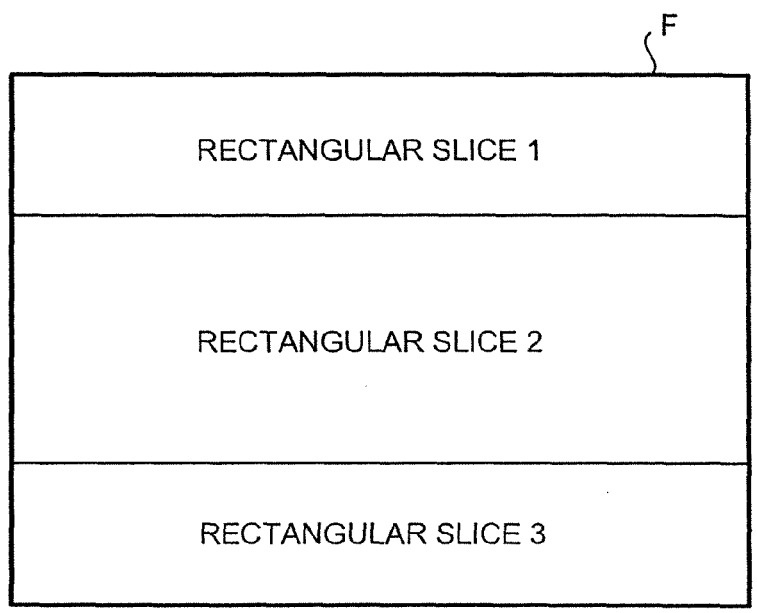
FIGS. 4B and 4C are schematic diagrams illustrating examples of division of the encoding frame.
Figure 4C:
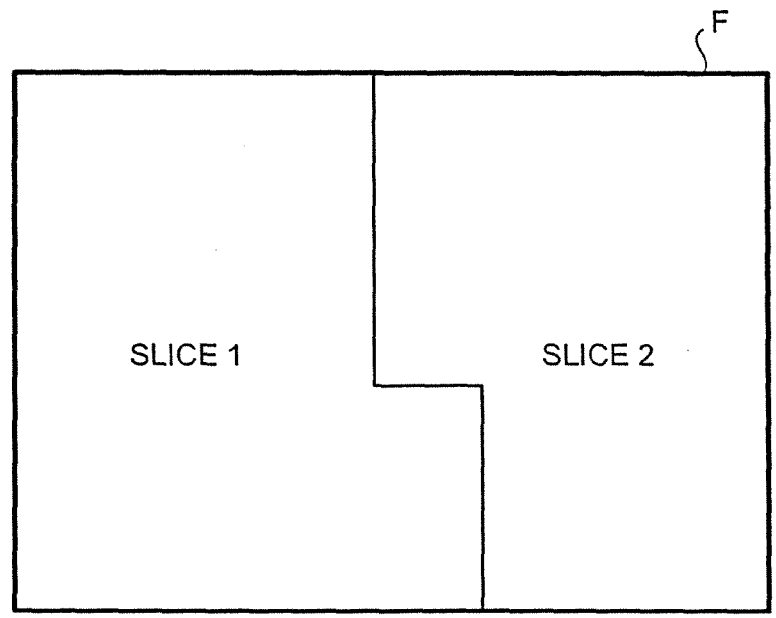
Figure 4D:
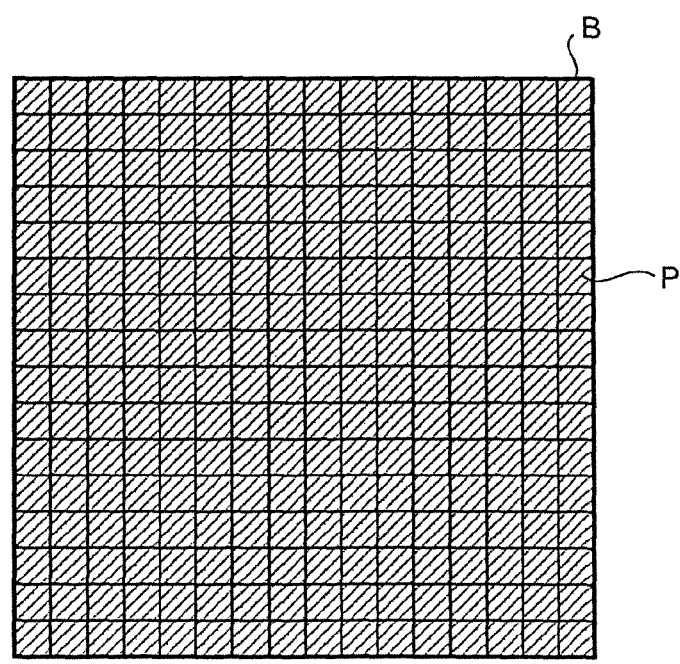
FIG. 4D is a schematic diagram of a pixel block.

Although the encoding process is performed in units of encoding frame F shown in FIG. 4A according to the first embodiment, the present invention is not limited to this scheme. For instance, the encoding process can be performed in units of encoding sequence, or as shown in FIG. 4B, in units of rectangular slice by dividing the encoding frame F into a plurality of rectangular slices (for example, rectangular slices 1 to 3). In addition, as shown in FIG. 4C, the encoding process can be performed in units of shape area by dividing the encoding frame F into a plurality of shape areas such as a circular shape, a rhombic shape, a diamond shape, and an L-shape (for example, slices 1 and 2). Furthermore, as shown in FIG. 4D, a pixel block (quantization block) B that is configured with a plurality of pixels P (for example, 16×16 pixels) can be used as units for the processing.

The quantization-matrix designing unit 12 designs a quantization matrix based on the code amount R, the encoding distortion D, and the quantization parameter input from the encoding processing unit 11, and outputs the designed quantization matrix to the encoding processing unit 11. On the quantization matrix designed by the quantization-matrix designing unit 12, a modeling is supposed to be performed in advance by a predetermined relational expression. The modeling of the quantization matrix is explained below. The quantization matrix is represented by a matrix according to a shape of units of processing (quantization block) used by the encoding processing unit 11. FIG. 5A shows an example of the quantization matrix when the quantization block is 4×4 pixels, and FIG. 5B shows an example of the quantization matrix when the quantization block is 8×8 pixels.

Each of the values included in the quantization matrix indicates a magnitude of a weight of the quantization scale, with a large value indicating a coarse quantization and a small value indicating a fine quantization. A top left component (0, 0) in the matrix indicates a magnitude of a weight of the quantization scale corresponding to a direct current (DC) value in the frequency, becoming a value corresponding to a high frequency component of an alternate current (AC) component toward a bottom right direction. The modeling of the quantization matrix means a formulation of the quantization matrix using a plurality of modeling parameters. An example of the method of formulating the quantization matrix is explained below with reference to FIGS. 6A to 6C.

Figure 6A:
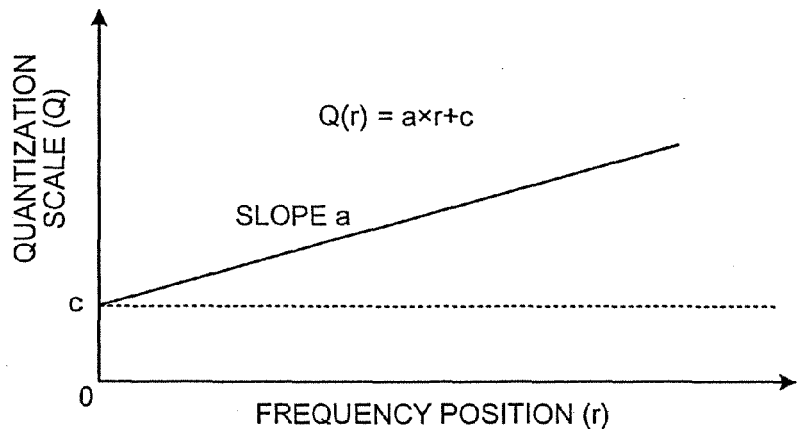
FIGS. 6A and 6B are graphs of relations between a position of the quantization matrix and a quantization scale.
Figure 6B:
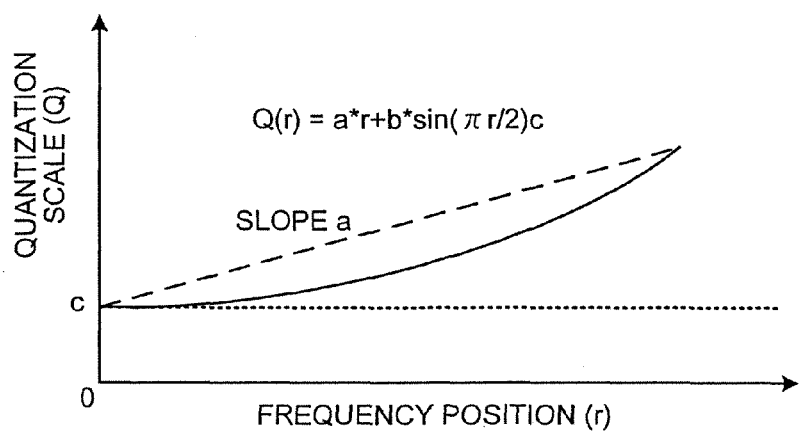

FIGS. 6A and 6B are graphs of relations between a position of a modeled quantization matrix (frequency position r) and a quantization matrix value Q, where the frequency position r is a value derived from following Equation (3).

$$r = |i+j| \quad (3)$$

In Equation (3), i and j are indexes representing positions of the quantization matrix. For instance, in the quantization matrix shown in FIG. 5A, because the DC value is (I, j)=(0, 0), its quantization matrix value Q becomes Q(0, 0)=6. In the graphs shown in FIGS. 6A and 6B, the quantization matrix value Q of the DC value is set to C. In the graph shown in FIG. 6A, the quantization matrix is modeled by taking a slope of change of matrix values as a slope A with the quantization scale C of the DC value as an intercept. The modeled quantization matrix is expressed by a modeling equation defined by following Equation (4). In Equation (4), Q(r) is one-dimensional expression of Q(i, j).

$$Q(r) = a \times r + c \quad (4)$$

Figure 6C:
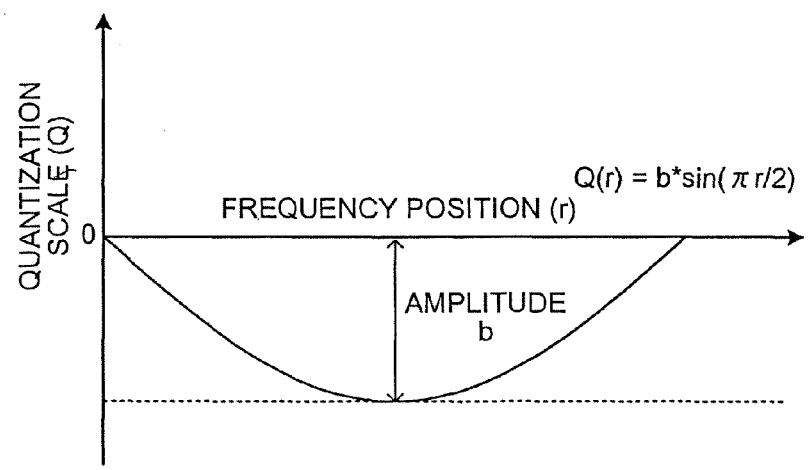
FIG. 6C is a graph of a sine function.

On the other hand, the graph shown in FIG. 6B shows another case of modeling by using other method, where a sine function shown in FIG. 6C is used as a more complicated model. The sine function used in the graph shown in FIG. 6B has an amplitude b as defined by following Equation (5).

$$Q(r) = b \times \sin\left(\frac{\pi r}{2}\right) \quad (5)$$

By adding Equation (4) and Equation (5), the state of the quantization matrix shown in FIG. 6B can be represented by a modeling equation defined as following Equation (6).

$$Q(r) = a \times r + b \times \sin\left(\frac{\pi r}{2}\right) + c \quad (6)$$

A parameter set for modeling the quantization matrix (hereinafter, referred to as "a modeling-parameter set") is (a, c) in Equation (4), and (a, b, c) in Equation (6). In the quantization-matrix designing unit 12, values of the modeling-parameter set are derived based no the code amount, the encoding distortion, and the quantization parameter input from the encoding processing unit 11, and performs a calculation of an optimized quantization matrix.

Although a modeling method is explained below using Equation (6) in the first embodiment, the present invention is not limited to this scheme. For instance, the modeling method can employ Equation (4), or can change an internal variable of the sine function. In addition, "r" indicating the frequency position can be used as a weighting function in the vertical or the horizontal direction, and a new modeling can be performed using a cosine function, an exponential function, a sigmoid function, or the like. No matter what method is used, it is important that the value of the quantization scale is changed for each frequency position according to the modeling parameter, and that the method uses a property that logarithms of the code amount R and the encoding distortion D are linearly changed according to increase and decrease of the modeling parameter.

Figure 7:
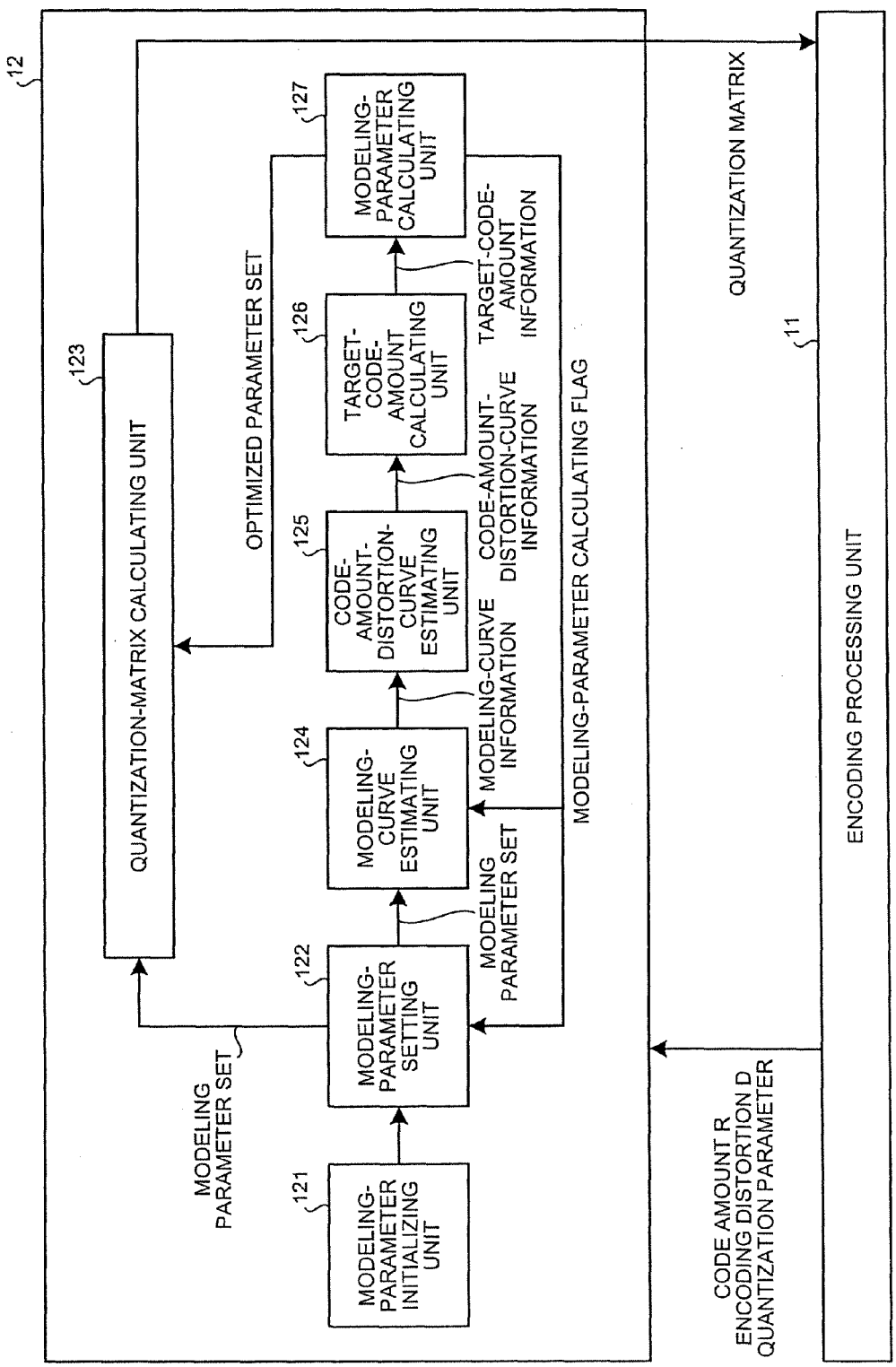
FIG. 7 is a block diagram illustrating a functional configuration of a quantization-matrix designing unit shown in FIG. 2.

Each of the function units included in the quantization-matrix designing unit 12 is explained below with reference to FIG. 7. FIG. 7 is a block diagram illustrating a functional configuration of the quantization-matrix designing unit 12. As shown in FIG. 7, the quantization-matrix designing unit 12 includes a modeling-parameter initializing unit 121, a modeling-parameter setting unit 122, a modeling-curve estimating unit 124, a code-amount-distortion-curve estimating unit 125, a target-code-amount calculating unit 126, a modeling-parameter calculating unit 127, and a quantization-matrix calculating unit 123.

The modeling-parameter initializing unit 121 sets (initializes) the modeling-parameter set (a, b, c) in Equation (6) to predetermined initial values (for example, (a, b, c)=(0, 0, 16)) based on setting information stored in advance in the storing unit. In addition, the modeling-parameter initializing unit 121 initializes modeling-curve information, encoding-distortion-curve information, and a target code amount to initial values (for example, null).

The modeling-parameter setting unit 122 performs a setting of the modeling parameter based on a modeling-parameter calculating flag input from the modeling-parameter calculating unit 127. The modeling-parameter calculating flag is a flag indicating a state regarding a calculation of the modeling parameter, which is input from the modeling-parameter calculating unit 127. If the modeling-parameter calculating flag is "0", it means that the calculation of the modeling parameter is impossible, and if it is "1", it means that the calculation of the modeling parameter is possible.

Figures 8, 9:
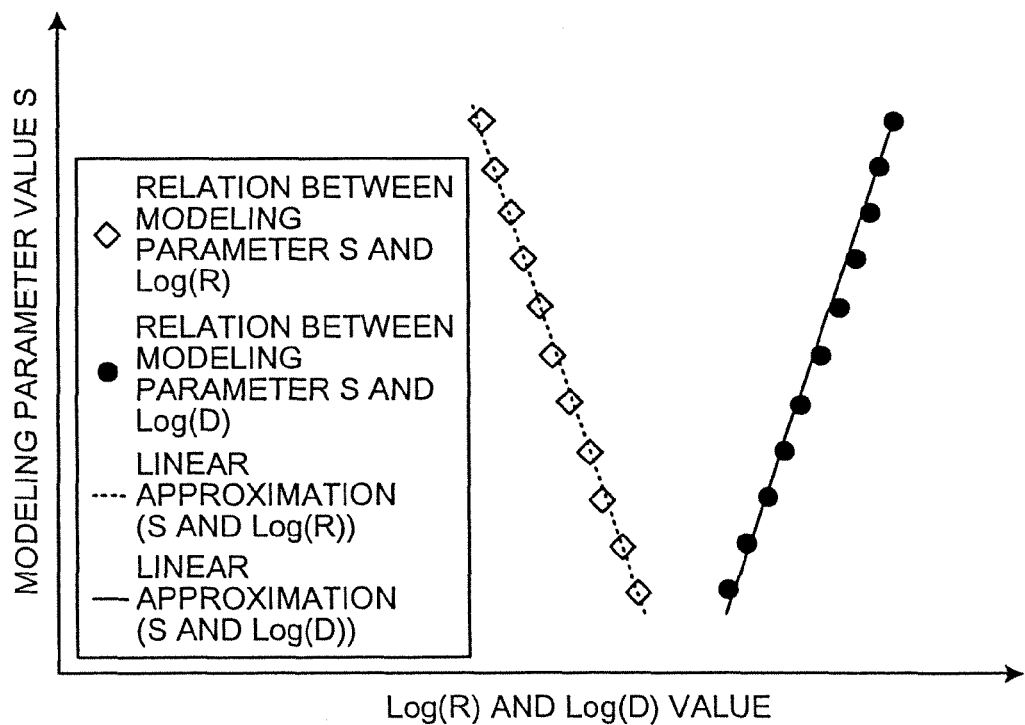
FIG. 8 is a schematic diagram of a modeling-parameter table.
FIG. 9 is a graph of an example of a linear approximation.

The modeling-parameter setting unit 122 sets a value corresponding to the state of the modeling-parameter calculating flag for each modeling parameter by referring to a modeling-parameter table stored in advance in the storing unit. FIG. 8 is a schematic diagram of an example of the modeling-parameter table stored in the storing unit.

The operation of the modeling-parameter setting unit 122 is explained below with reference to FIG. 8. If the modeling-parameter calculating flag input from the modeling-parameter calculating unit 127 is "0", the modeling-parameter setting unit 122 updates the modeling-parameter set by setting a value registered for the first time in the modeling-parameter table to a modeling parameter corresponding to a modeling-parameter index. On the other hand, if the modeling-parameter calculating flag is "1", the modeling-parameter setting unit 122 updates the modeling-parameter table by setting a value registered for the second time in the modeling-parameter table to the modeling parameter corresponding to the modeling-parameter index.

For instance, "0.0" is set to a modeling parameter "a" when the modeling-parameter calculating flag is "0", and "4.0" is set when the modeling-parameter calculating flag is "1". In the same manner, "−2.0" is set to a modeling parameter "b" when the modeling-parameter calculating flag is "0", and "2.0" is set when the modeling-parameter calculating flag is "1". In a modeling parameter "c", "10.0" is set when the modeling-parameter calculating flag is "0", and "20.0" is set when the modeling-parameter calculating flag is "1". Furthermore, if the modeling-parameter calculating flag is "1", the modeling-parameter setting unit 122 increments a value of the modeling-parameter index by "1" with the setting of the modeling parameter, thus taking the next modeling parameter as a setting target.

In addition, the modeling-parameter setting unit 122 stores a modeling-parameter index indicating a modeling parameter to be processed from among the modeling-parameter set (a, b, c) in the RAM 3. Specifically, when estimating the modeling parameter "a", the modeling-parameter index is supposed to set "0". Furthermore, when estimating the modeling parameter "b", the modeling-parameter index is supposed to set "1", and when estimating the modeling parameter "c", the modeling-parameter index is supposed to set "2".

In the modeling-parameter setting unit 122, when a value of the first time setting of the modeling parameter "a" (modeling-parameter calculating flag is "0") is set, the setting value of the modeling parameter "a" is passed to the quantization-matrix calculating unit 123 and the modeling-curve estimating unit 124. Namely, the modeling-parameter setting unit 122 is configured to the set modeling parameter value to the quantization-matrix calculating unit 123 and the modeling-curve estimating unit 124 each time the modeling parameter is set.

Upon receiving the value of the modeling parameter set by the modeling-parameter setting unit 122, the quantization-matrix calculating unit 123 obtains the quantization matrix using Equation (6) in which the value of the modeling parameter is substituted, and outputs the obtained quantization matrix to the encoding processing unit 11. With this mechanism, the code amount R, the encoding distortion D, and the quantization parameter corresponding to the quantization matrix are fed back from the encoding processing unit 11 to the quantization-matrix designing unit 12. Then, the code amount R, the encoding distortion D, and the quantization parameter output from the encoding processing unit 11 are stored in a predetermined area of the RAM which can be referred by each function unit of the quantization-matrix designing unit 12.

Furthermore, upon receiving an optimized parameter set (a, b, c) from the modeling-parameter calculating unit 127, the quantization-matrix calculating unit 123 obtains a quantization matrix using Equation (6) in which each value of the optimized parameter set is substituted (hereinafter, referred to as "an optimized quantization matrix"), and outputs the optimized quantization matrix to the encoding processing unit 11.

The modeling-curve estimating unit 124 estimates a modeling-curve information based on the modeling-parameter set that is set by the modeling-parameter setting unit 122 and the code amount R and the encoding distortion D that are input from the encoding processing unit 11, and outputs the estimated modeling-curve information to the code-amount-distortion-curve estimating unit 125.

Specifically, the modeling-curve estimating unit 124 checks the modeling-parameter calculating flag set by the modeling-parameter calculating unit 127, and if the value of the modeling-parameter calculating flag is "0", stores various pieces of input information in the RAM 3 as a first-time modeling parameter, and outputs the modeling-curve information initialized by the modeling-parameter initializing unit 121 to the code-amount-distortion-curve estimating unit 125 without performing an estimation of the modeling parameter.

On the other hand, if the value of the modeling-parameter calculating flag is "1", the modeling-curve estimating unit 124 stores various pieces of input information in the RAM 3 as a second-time modeling parameter. After that, the modeling-curve estimating unit 124 performs a calculation (estimation) of an approximate expression (modeling curve) representing the modeling parameter based on the stored two times of modeling parameters. According to the first embodiment, the modeling curve is estimated by using a property that the modeling parameter S can be linearly approximated to the logarithm of the code amount R and the logarithm of the encoding distortion D. The modeling parameter S means one modeling parameter to be optimized from among the modeling parameters "a", "b", and "c".

FIG. 9 is a graph of an example of the linear approximation of the modeling parameter S to the logarithm of the code amount R and the logarithm of the encoding distortion D. The graph shown in FIG. 9 shows a monotonous change of the logarithm of the code amount R and the logarithm of the encoding distortion D with an increase of the modeling parameter S. The code amount R and the encoding distortion D shown in FIG. 9 can be approximated by following Equations (7) and (8).

$$\text{Log } R = d + e \times S \quad (7)$$

$$\text{Log } D = f + g \times S \quad (8)$$

In Equations (7) and (8), d, e, f, and g are predetermined fixed values different for each of encoding areas, R is the code amount, D is the encoding distortion, and S is the modeling parameter. The modeling-curve estimating unit 124 calculates d, e, f, and g from Equations (7) and (8) using sets of the two times of the code amounts R and the encoding distortions D (R1, D1) and (R2, D2) stored in the RAM 3. With the above procedures, a relational expression between the code amount R and the modeling parameter S and a relational expression between the encoding distortion D and the modeling parameter S are obtained. The modeling-curve estimating unit 124 outputs the obtained two relational expressions to the code-amount-distortion-curve estimating unit 125 as the modeling-curve information. When the quantization matrix is obtained by the quantization-matrix calculating unit 123 according to units of processing of the encoding processing unit 11, the modeling-curve estimating unit 124 outputs the modeling-curve information for each of the units of processing.

The code-amount-distortion-curve estimating unit 125 estimates code-amount-distortion-curve information based on the modeling-curve information input from the modeling-curve estimating unit 124, and outputs the estimated code-amount-distortion-curve information to the target-code-amount calculating unit 126.

Specifically, the code-amount-distortion-curve estimating unit 125 determines whether the modeling-curve information input from the modeling-curve estimating unit 124 is an initial value, and if it is determined that the modeling-curve information is the initial value, outputs the code-amount-distortion-curve information initialized by the modeling-parameter initializing unit 121 to the target-code-amount calculating unit 126.

On the other hand, if it is determined that the modeling-curve information is not the initial value, the code-amount-distortion-curve estimating unit 125 performs an estimation of the code-amount-distortion-curve information. Specifically, the code-amount-distortion-curve estimating unit 125 derives following Equation (9) by eliminating the modeling parameter S from Equations (7) and (8) input as the modeling-curve information.

$$R = D^k \times l \quad (9)$$

In Equation (9), k and l are defined by following Equations (10) and (11).

$$k = \exp\left(\frac{(dg - ef)}{g}\right) \quad (10)$$

$$l = \frac{e}{g} \quad (11)$$

Namely, the code-amount-distortion-curve estimating unit 125 derives a relational expression defined by Equation (9) from the input modeling-curve information. Then, the derived relational expression is output to the target-code-amount calculating unit 126 as the code-amount-distortion-curve information.

The target-code-amount calculating unit 126 calculates target-code-amount information based on the code-amount-distortion-curve information input from the code-amount-distortion-curve estimating unit 125, and outputs the calculated target-code-amount information to the modeling-parameter calculating unit 127.

Specifically, the target-code-amount calculating unit 126 determines whether the code-amount-distortion-curve information input from the code-amount-distortion-curve estimating unit 125 is an initial value, and if it is determined that the code-amount-distortion-curve information is the initial value, outputs the target-code-amount information initialized by the modeling-parameter initializing unit 121 to the modeling-parameter calculating unit 127.

On the other hand, if it is determined that the input code-amount-distortion-curve information is not the initial value, the target-code-amount calculating unit 126 performs a calculation of a target code amount. Specifically, the target-code-amount calculating unit 126 modifies Equation (9) input as the code-amount-distortion-curve information into following Equation (12).

$$D = \left(\frac{R}{l}\right)^{\frac{1}{k}} \quad (12)$$

After that, the target-code-amount calculating unit 126 derives following Equation (13) by performing a partial differentiation of both sides of Equation (12) with respect to the code amount R.

$$\frac{\partial D}{\partial R} = \left(\frac{1}{k}\right) \times \left(\frac{1}{l}\right)^{\frac{1}{k}} \times R^{\frac{1-k}{k}} \quad (13)$$

By employing the Lagrange's method of undetermined multipliers represented by Equation (2), following Equation (14) is established from a constraint of target code amount Rc<code amount R.

$$\frac{\partial D}{\partial R_C} = -\lambda \quad (14)$$

Subsequently, the target-code-amount calculating unit 126 derives following Equation (15) from Equations (13) and (14), and outputs Equation (15) to the modeling-parameter calculating unit 127 as the target-code-amount information. In Equation (15), k and l are values obtained from Equations (10) and (11).

$$R_C = \left(-k\lambda l^{\frac{1}{k}}\right)^{\frac{k}{1-k}} \quad (15)$$

The modeling-parameter calculating unit 127 calculates a value of the modeling parameter S by using the target-code-amount information input from the target-code-amount calculating unit 126 and the quantization parameter input from the encoding processing unit 11.

Specifically, the modeling-parameter calculating unit 127 determines whether the target-code-amount information input from the target-code-amount calculating unit 126 is an initial value, and if it is determined that the target-code-amount information is the initial value, performs a calculation of the modeling parameter S through a calculation process, which will be explained later, after setting the modeling-parameter calculating flag to "1". On the other hand, if it is determined that the target-code-amount information is not the initial value, the modeling-parameter calculating unit 127 performs a calculation of the modeling parameter S after setting the modeling-parameter calculating flag to "0".

A calculation process of the modeling parameter S is explained below. The modeling-parameter calculating unit 127 according to the first embodiment derives the modeling parameter S by using a property that the Lagrange's undetermined multiplier expressed by following Equation (16) can be approximated with a function of the quantization parameter. In Equation (16), QP indicates the quantization parameter.

$$\lambda = 0.85 * 2^{\left(\frac{QP-12}{3}\right)} \quad (16)$$

The modeling-parameter calculating unit 127 calculates the target code amount Rc by eliminating λ using Equation (16) and the target-code-amount information represented by Equation (15). After that, the modeling-parameter calculating unit 127 derives the modeling parameter S by substituting the calculated target code amount Rc for the code amount R in Equation (7).

In a case that the modeling parameters S derived for the first time and the second time are largely deviated, it is expected that the code amount occurred in the encoding frame is extremely small. For instance, if all of the transform coefficients are "0", there is no need for performing a quantization in a frame to be coded, and the code amount is not changed by the quantization matrix. Therefore, the modeling-parameter calculating unit 127 compares the values of the first modeling parameter S with the second modeling parameter S, and if both of the modeling parameters S are deviated from each other by a predetermined value, performs a correction of the modeling parameter by clipping (replacing) to a value within an assumed value range that is determined in advance (for example, within a range from 0.0 to 4.0 for the modeling parameter "a" shown in FIG. 8).

With this mechanism, even when the modeling parameter S is considerably deviated from a predetermined assumed value, because it is possible to correct the modeling parameter S to a value within a value range assumed in advance, the encoding efficiency can be maintained.

Although the clipping is performed for correcting the modeling parameter S according to the first embodiment, the present invention is not limited to this scheme. As for another embodiment, the modeling parameter can be set to a default value assumed in advance, or it can be set not to use the derived modeling parameter S.

As describe above, the modeling-parameter calculating flag set by the modeling-parameter calculating unit 127 is passed to the modeling-parameter setting unit 122 and the modeling-curve estimating unit 124. With this mechanism, a modeling-parameter calculating loop (a loop of process flowing in order of the modeling-parameter setting unit 122→the quantization-matrix calculating unit 123→the encoding processing unit 11→the modeling-curve estimating unit 124→the code-amount-distortion-curve estimating unit 125→the target-code-amount calculating unit 126→the modeling-parameter calculating unit 127) is performed two times for a single modeling parameter. According to the first embodiment, because it is necessary to derive three modeling parameters (a, b, c), a total of six times of modeling-parameter calculating loops is performed.

The modeling-parameter calculating unit 127 outputs a modeling-parameter set obtained by performing six times of modeling-parameter calculating loops (hereinafter, referred to as "an optimized parameter set") to the quantization-matrix calculating unit 123.

Referring back to FIG. 2, the encoding control unit 13 performs a feedback control and a quantization characteristic control of occurred code amount of the encoding processing unit 11, a mode determination control, a rate control for performing a control of the occurred code amount, a control of the prediction process, a control of an external input parameter, and an overall control of the encoding. In addition, the encoding control unit 13 has a function of performing a timing control of the quantization-matrix designing unit 12 and the encoding processing unit 11 and outputting the encoding data to the outside at an appropriate timing.

Figure 10:
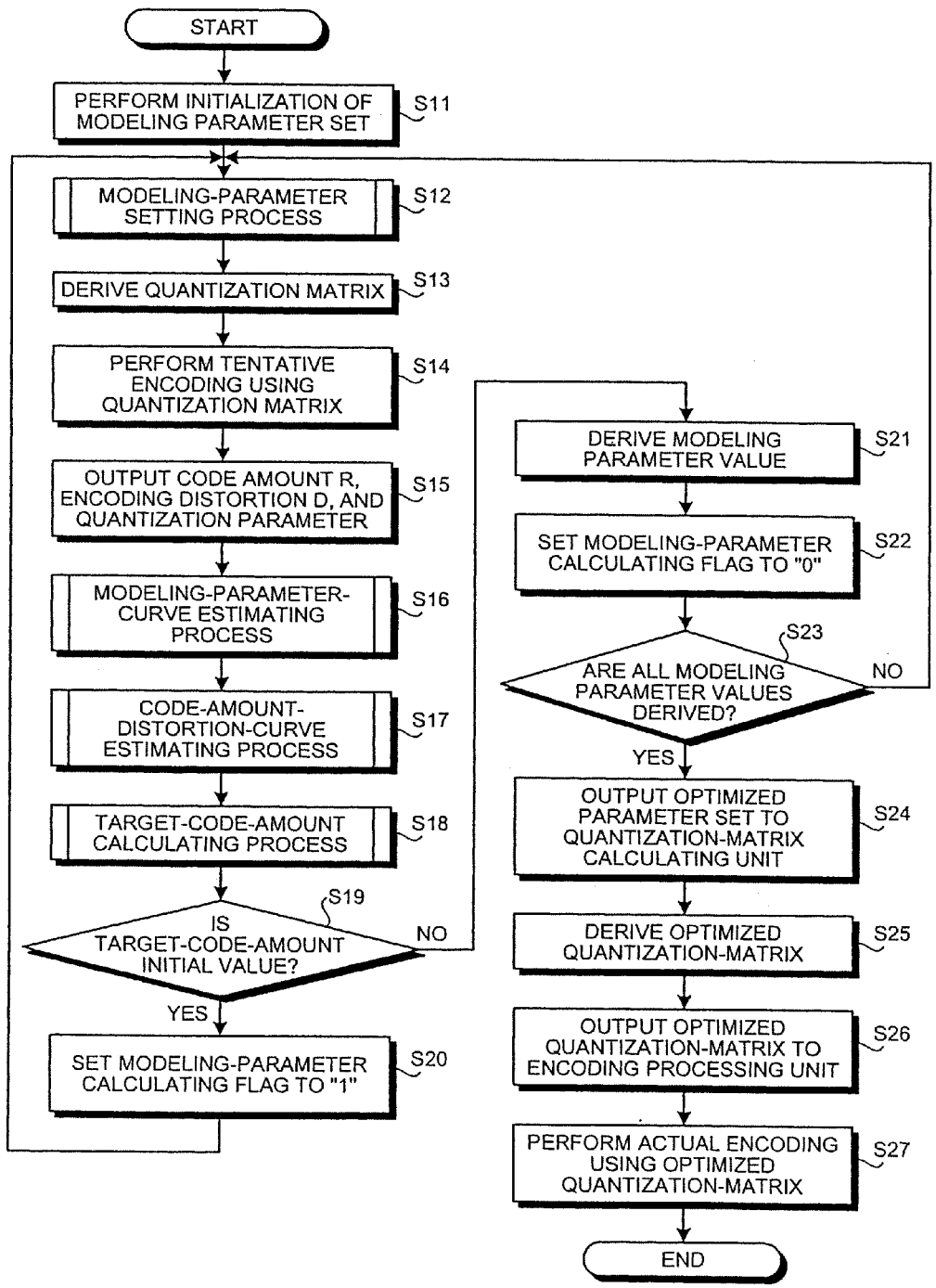
FIG. 10 is a flowchart of an image encoding process.

An image encoding method performed by the image encoding apparatus 100 according to the first embodiment is explained below with reference to FIG. 10. FIG. 10 is a flowchart of the image encoding process.

When an input image signal of one frame is input to the image encoding apparatus 100, the modeling-parameter initializing unit 121 performs an initialization of the modeling-parameter set, modeling-curve information, the code-amount-distortion-curve information, and the target code amount at a predetermined timing under a control of the encoding control unit 13, and outputs the initialized modeling-parameter set to the modeling-parameter setting unit 122 (Step S11).

At following Step S12, a modeling-parameter setting process is performed by the modeling-parameter setting unit 122. The modeling-parameter setting process performed at Step S12 is explained below with reference to FIG. 11.

Figure 11:
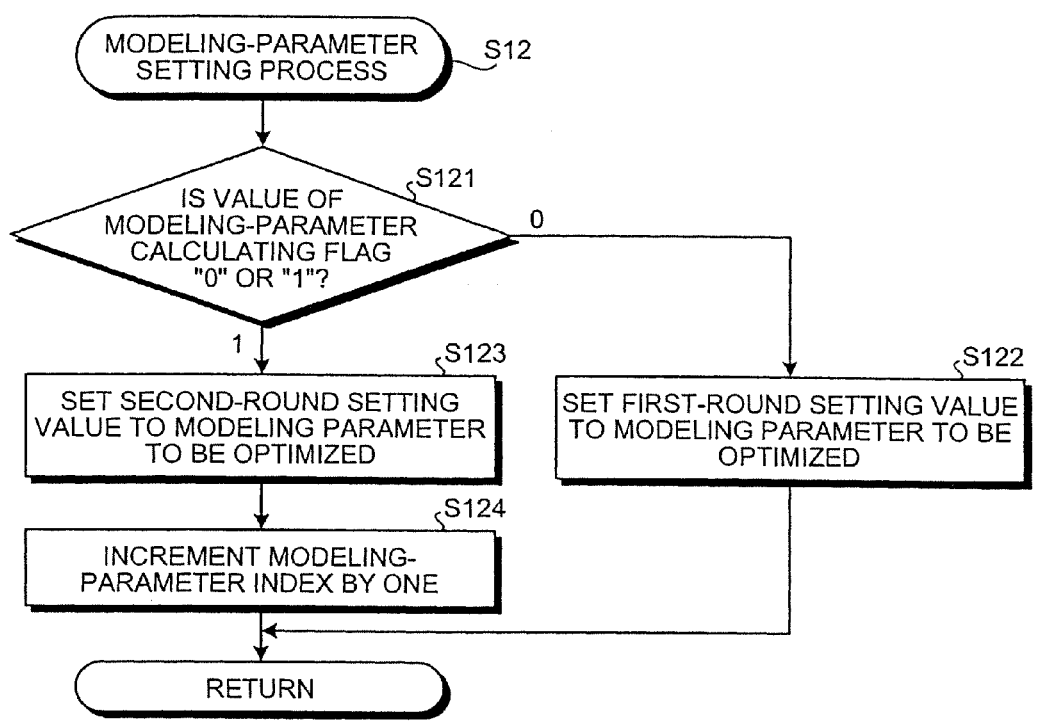
FIG. 11 is a flowchart of a modeling-parameter setting process.

FIG. 11 is a flowchart of the modeling-parameter setting process performed by the modeling-parameter setting unit 122. The modeling-parameter setting unit 122 determines a state of the modeling-parameter calculating flag input from the modeling-parameter calculating unit 127 (Step S121). When it is determined that the input modeling-parameter calculating flag is "0" ("0" at Step S121), the modeling-parameter setting unit 122 updates the modeling-parameter set by referring to the modeling-parameter table and setting the first setting value corresponding to the modeling parameter to be optimized from among the modeling-parameter set to the modeling parameter (Step S122), and the process control moves to Step S13.

On the other hand, when it is determined that the modeling-parameter calculating flag is "1" at Step S121 ("1" at Step S121), the modeling-parameter setting unit 122 updates the modeling-parameter set by referring to the modeling-parameter table and setting the second setting value corresponding to the modeling parameter to be optimized from among the modeling-parameter set to the modeling parameter (Step S123). After that, the process control moves to Step S13, after incrementing the modeling-parameter index, which is an internal index, by "1" (Step S124).

Referring back to FIG. 10, the quantization-matrix calculating unit 123 derives the quantization matrix by substituting the modeling-parameter set updated by the modeling-parameter setting unit 122 in Equation (6), and outputs the derived quantization matrix to the encoding processing unit 11 (Step S13).

Subsequently, the encoding processing unit 11 performs a tentative encoding of the input image signal by using the input quantization matrix (Step S14), and outputs the code amount R and the encoding distortion D calculated at the tentative encoding along with the quantization parameter to the quantization-matrix designing unit 12 (Step S15).

At Step S16, a modeling-parameter-curve estimating process is performed by the modeling-curve estimating unit 124. The modeling-parameter-curve estimating process performed at Step S16 is explained below with reference to FIG. 12.

Figure 12:
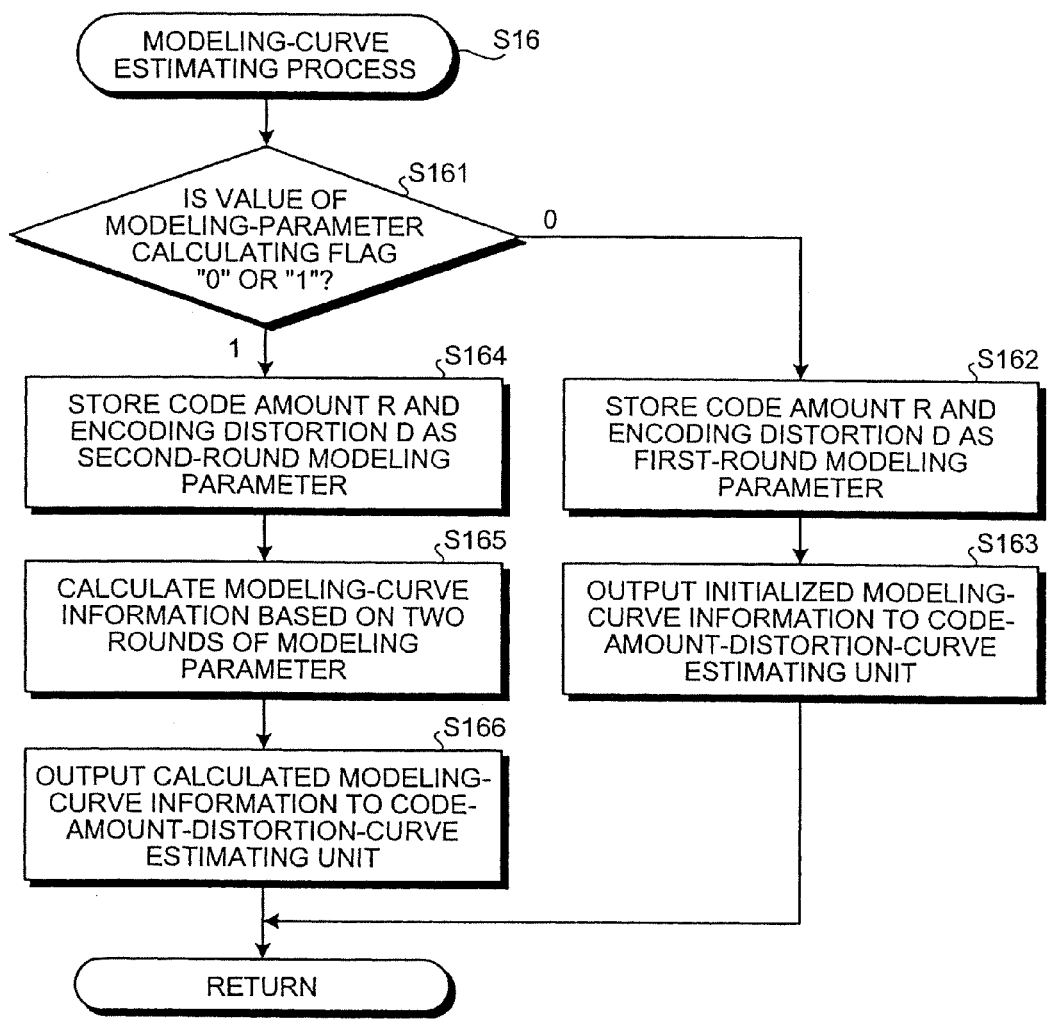
FIG. 12 is a flowchart of a modeling-curve estimating process.

FIG. 12 is a flowchart of the modeling-curve estimating process performed by the modeling-curve estimating unit 124. The modeling-curve estimating unit 124 determines a state of the modeling-parameter calculating flag input from the modeling-parameter calculating unit 127 (Step S161). When it is determined that the input modeling-parameter calculating flag is "0" ("0" at Step S161), the modeling-curve estimating unit 124 stores the code amount R and the encoding distortion D input from the encoding processing unit 11 at Step S15 in a predetermined area of the RAM 3 as the first modeling parameter (Step S162). After that, the modeling-curve estimating unit 124 outputs the modeling-curve information initialized at Step S11 to the code-amount-distortion-curve estimating unit 125 (Step S163), and moves to the code-amount-distortion-curve estimating process at Step S17.

On the other hand, if the input modeling-parameter calculating flag is "1" ("1" at Step S161), the modeling-curve estimating unit 124 stores the code amount R and the encoding distortion D input from the encoding processing unit 11 at Step S15 in a predetermined area of the RAM 3 as a second modeling parameter (Step S164). After that, the modeling-curve estimating unit 124 calculates an approximate expression of the modeling parameter S regarding the code amount R and an approximate expression of the modeling parameter S regarding the encoding distortion D by using the two times of modeling-parameter sets (R1, D1) and (R2, D2) stored in the RAM 3 and the modeling parameter S (Step S165), outputs the calculated approximate expressions to the code-amount-distortion-curve estimating unit 125 as the modeling-curve information (Step S166), and moves to the code-amount-distortion-curve estimating process at Step S17.

Figure 13:
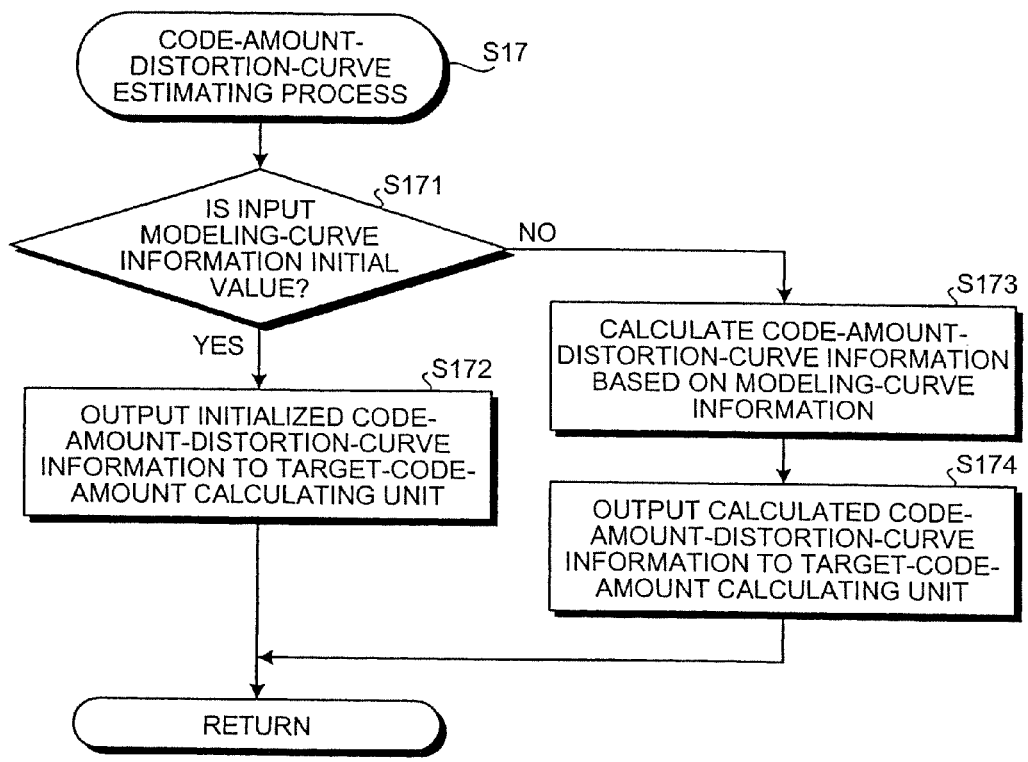
FIG. 13 is a flowchart of a code-amount-distortion-curve estimating process.

FIG. 13 is a flowchart of the code-amount-distortion-curve estimating process performed at Step S17. The code-amount-distortion-curve estimating unit 125 determines whether the modeling-curve information input from the modeling-curve estimating unit 124 is an initial value (Step S171). If it is determined that the modeling-curve information is the initial value ("Yes" at Step S171), the code-amount-distortion-curve estimating unit 125 outputs the code-amount-distortion-curve information initialized at Step S11 to the target-code-amount calculating unit 126 (Step S172), and moves to the target-code-amount calculating process at Step S18.

On the other hand, if it is determined that the modeling-curve information is not the initial value ("No" at Step S171), the code-amount-distortion-curve estimating unit 125 calculates a relational expression defined by Equation (9) from the input modeling-curve information (Step S173), outputs the calculated relational expression to the target-code-amount calculating unit 126 as the code-amount-distortion-curve information (Step S174), and moves to the target-code-amount calculating process at Step S18.

Figure 14:
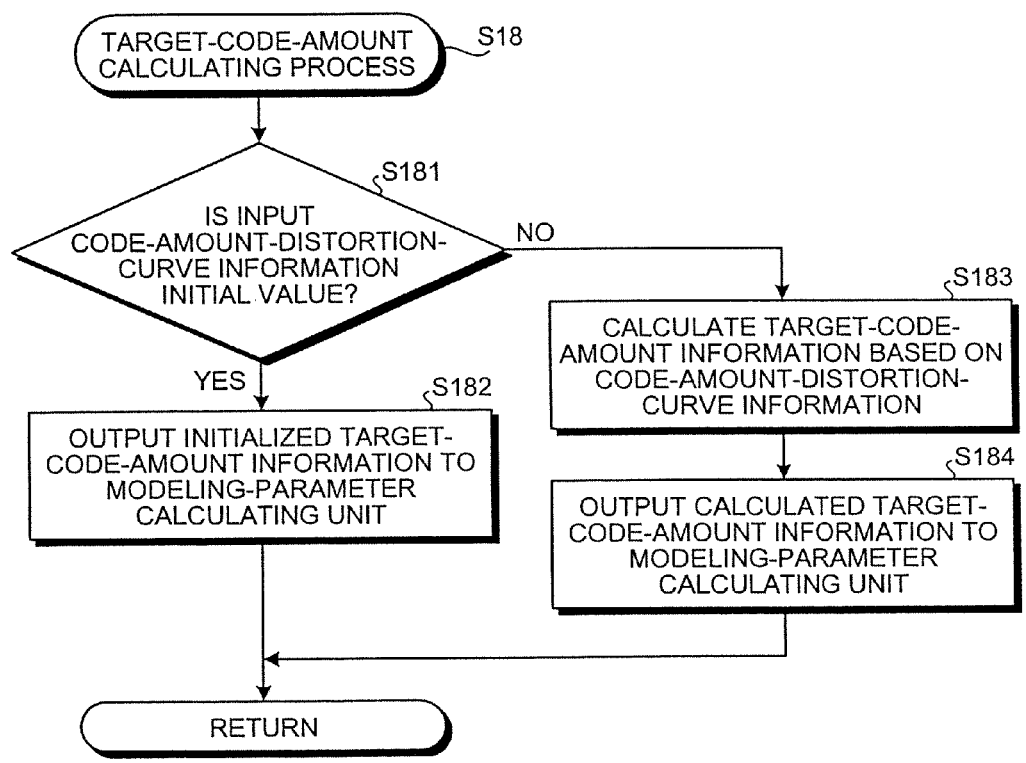
FIG. 14 is a flowchart of a target-code-amount calculating process.

FIG. 14 is a flowchart of the target-code-amount calculating process performed at Step S18. At Step S181, the target-code-amount calculating unit 126 determines whether the code-amount-distortion-curve information input from the code-amount-distortion-curve estimating unit 125 is an initial value (Step S181). If it is determined that the code-amount-distortion-curve information is the initial value ("Yes" at Step S181), the target-code-amount calculating unit 126 outputs the target-code-amount information initialized at Step S11 to the modeling-parameter calculating unit 127 (Step S182), and moves to the target-code-amount calculating process at Step S19.

On the other hand, if it is determined that the input code-amount-distortion-curve information is not the initial value ("No" at Step S181), the target-code-amount calculating unit 126 calculates target-code-amount information by using the input code-amount-distortion-curve information and Equations (12) to (15) (Step S183), outputs the calculated target-code-amount information to the modeling-parameter calculating unit 127 (Step S184), and moves to the target-code-amount calculating process at Step S19.

Referring back to FIG. 10, at Step S 19, the modeling-parameter calculating unit 127 determines whether the target-code-amount information input from the target-code-amount calculating unit 126 is an initial value. If it is determined that the target-code-amount information is the initial value ("Yes" at Step S19), the modeling-parameter calculating unit 127 sets the modeling-parameter calculating flag to "1" (Step S20), and the process control returns to Step S12.

On the other hand, if it is determined that the target-code-amount information is not the initial value ("No" at Step S19), the modeling-parameter calculating unit 127 derives a value of the modeling parameter S to be processed using the input target-code-amount information and Equations (16) and (7) (Step S21). The modeling-parameter calculating unit 127 sets the modeling-parameter calculating flag to "0" (Step S22), and the process control moves to Step S23.

At Step S23, the modeling-parameter calculating unit 127 determines whether the modeling-parameter calculating loop is perform for six times, i.e., the process of Step S21 is performed for all of the modeling parameters S. If it is determined that there is any modeling parameter S that is not processed ("No" at Step S23), the process control returns to Step S12 to repeatedly perform the modeling-parameter calculating loop.

On the other hand, if it is determined that the process of Step S21 is performed for all of the modeling parameters S ("Yes" at Step S23), the modeling-parameter calculating unit 127 outputs the modeling-parameter set derived so far (optimized parameter set) to the quantization-matrix calculating unit 123 (Step S24).

Subsequently, the quantization-matrix calculating unit 123 derives the quantization matrix (optimized quantization matrix) by using the optimized parameter set input from the modeling-parameter calculating unit 127 and Equation (6) (Step S25), and outputs the derived quantization matrix to the encoding processing unit 11 (Step S26).

The encoding processing unit 11 performs an encoding (actual encoding) of the input image signal of one frame input at Step S11 by using the input optimized quantization matrix (Step S27), and the process control ends the process. The above process is performed every time the input image signal of one frame is input.

As described above, according to the first embodiment, the quantization matrix is obtained from a modeling equation using the code amount and the encoding distortion calculated at the time of a tentative encoding. Therefore, because a quantization matrix appropriate for an image signal can be designed, it is possible to improve the encoding efficiency. Furthermore, because a relation between the code amount and the encoding distortion and the modeling parameter regarding the quantization matrix is represented by an approximate expression, and an optimized quantization matrix is obtained based on the approximate expression, it is possible to reduce a processing cost required for designing the quantization matrix.

Although the first embodiment is about a design of the quantization matrix with respect to one encoding frame, the unit of designing the quantization matrix is not limited to one encoding frame. For instance, the quantization matrix can be designed using the above method with respect to a 32×32 pixel block, a 16×16 pixel block, an 8×8 pixel block, or the like. In this case, the encoding processing unit 11 outputs the code amount R and the encoding distortion D obtained when performing the encoding process with respect to one of the 32×32 pixel block, the 16×16 pixel block, the 8×8 pixel block, or the like to the quantization-matrix designing unit 12.

Furthermore, although the first embodiment employs a property that the logarithm of the code amount R and the logarithm of the encoding distortion D can be linearly approximated with respect to the modeling parameter S, as is clear from the modification of Equations (7) and (8) into Equations (17) and (18), it is equivalent to an employment of a property that the code amount R and the encoding distortion D can be exponentially approximated with respect to the modeling parameter S.

$$R = m \times \exp(n \times S) \tag{17}$$

$$D = o \times \exp(p \times S) \tag{18}$$

In Equations (17) and (18), m, n, o, and p are variables of which values are uniquely determined with respect to image data. With a similar concept, a property of Equation (9) can be considered that the code amount R can be power approximated with respect to the encoding distortion D. According to the first embodiment, the property of the linear approximation is used from easiness of the approximation. However, the present invention is not limited to this scheme, but the modeling parameter can be derived using the other approximation methods described above.

Figure 15:
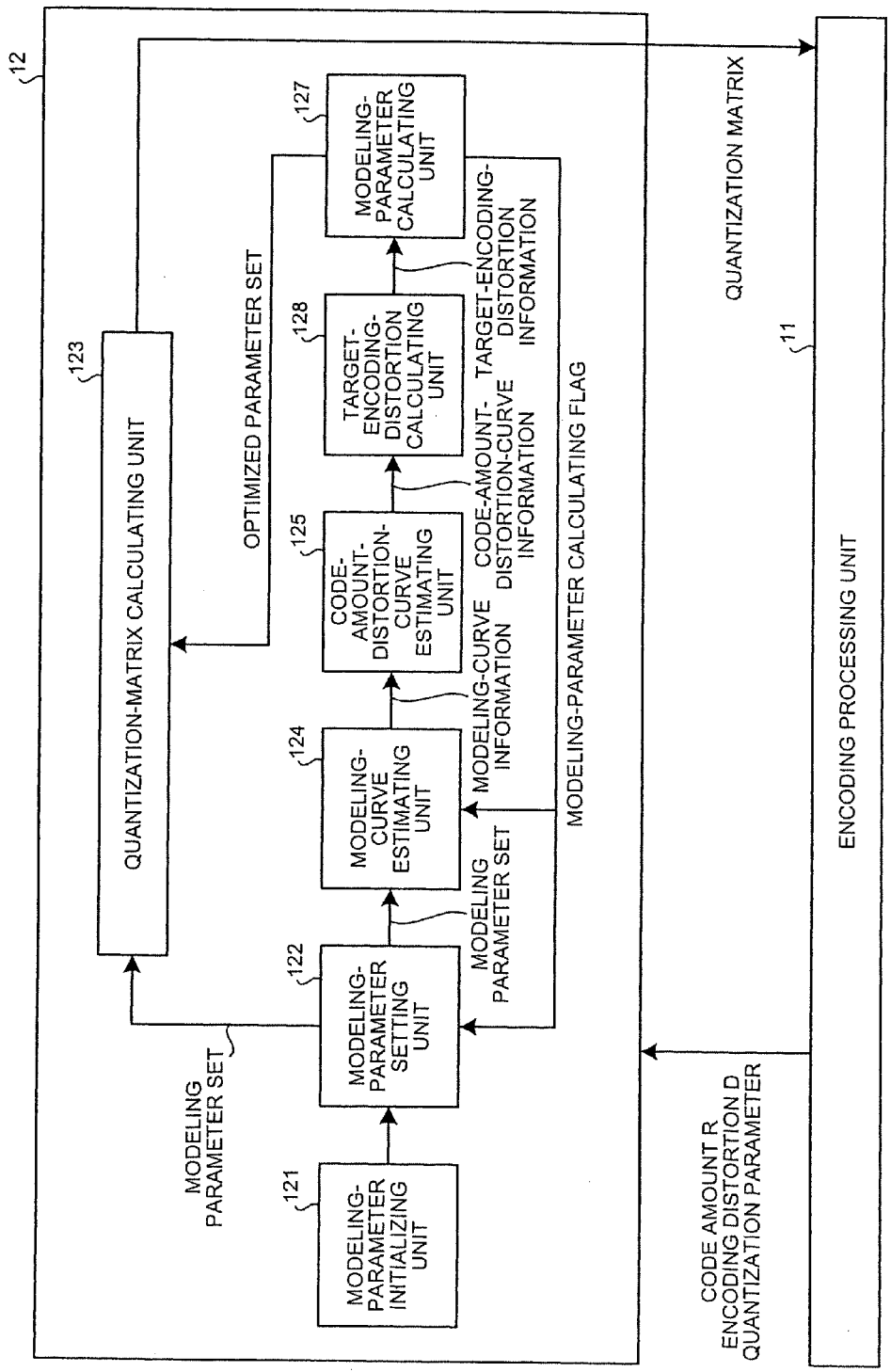
FIG. 15 is a block diagram illustrating another functional configuration of the quantization-matrix designing unit shown in FIG. 2.

Furthermore, according to the first embodiment, although the modeling parameter is derived using the target-code-amount information calculated by the target-code-amount calculating unit 126 based on the code amount R, the present invention is not limited to this scheme, but the modeling parameter can be derived based on the encoding distortion D. In this case, the quantization-matrix designing unit 12 can be configured as shown in FIG. 15. In FIG. 15, the same reference numerals are assigned for the components same as the configuration shown in FIG. 3, and explanations for such components are omitted.

In FIG. 15, a target-encoding-distortion calculating unit 128 derives following Equation (19) by performing a partial differentiation of Equation (9) with the encoding distortion D.

Then, the target-encoding-distortion calculating unit 128 derives following Equation (20) by using Equations (14) and (19).

$$\frac{\partial R}{\partial D} = k \times l \times D^{k-1} \quad (19)$$

$$D_v = \left(-\frac{1}{\lambda \times k \times l}\right)^{\frac{1}{k-1}} \quad (20)$$

The target-encoding-distortion calculating unit 128 outputs a target encoding distortion Dv to the modeling-parameter calculating unit 127 as the target-encoding-distortion information. Then, the modeling-parameter calculating unit 127 can derive the modeling parameter S from the input target-encoding-distortion information by using Equations (16) and (8).

Although examples of a 4×4 pixel block and an 8×8 pixel block are shown as the quantization matrix according to the first embodiment, the quantization matrix is configured to be designed according to a quantization block size in the encoding process. When a three-dimensional quantization including time and space is performed at the encoding processing unit 11, a quantization matrix of an arbitrary shape, such as 4×4×4, 8×8×8, and 8×8×4, can be generated. For such quantization matrix, the same modeling process is performed, and a quantization matrix in consideration of the code amount R and the encoding distortion D can be designed by using the above estimation method with respect to the modeling parameter.

Furthermore, although six times of encoding processes are required for each of the encoding frames according to the first embodiment, the prediction process S1 or the mode determination process 52 can be omitted. Specifically, by performing a prediction process of a prediction mode with a high selectivity from among a plurality of prediction modes and a determination process, it is possible to omit a prediction mode with a low selectivity. In this case, although the estimation accuracy is a little bit lowered because the optimum code amount R and the optimum encoding distortion D cannot be obtained, a high-speed quantization-matrix design becomes possible.

In addition, when performing the intra-picture prediction, a movement search process is performed using a reference image that is temporally different from the encoding frame. The movement search process is generally performed by a matching process for each block. It is known that the matching process for each block takes a large cost because of a considerable amount of iteration process. Because a high-speed tentative encoding is performed when designing the quantization matrix, it is important to reduce the matching process. Specifically, when performing a design of the quantization matrix, a movement search process is performed with reduced search points, to reduce the processing cost. When performing an actual encoding after the design of the quantization matrix is completed, the encoding efficiency can be maintained by performing a movement search process with a better prediction performance. In addition, the processing cost can be reduced by employing a diamond search for designing the quantization matrix and a full search for the actual encoding process.

Moreover, according to the first embodiment, the modeling parameter can be respectively derived for luminance component and color-difference component. Specifically, when calculating the code amount R and the encoding distortion D at the tentative encoding, a code amount RL and an encoding distortion DL of the luminance and a code amount RC and an encoding distortion DC of the color difference are separately calculated. Then, by approximating the modeling parameter by using Equations (7) to (16) with respect to a modeling parameter set (RL, DL) and (RC, DC) corresponding to each component, the quantization matrix can be designed with respect to each component. When the input image contains a color space such as R, G, and B, it is also possible to design the quantization matrix for each of R, G, and B. Furthermore, when calculating the respective code amounts RL and RC, if encoding modes of the luminance and the color difference are common, because side information transmitted the a decoder side as an encoding mode cannot be divided, the quantization matrix can be designed using a code amount of a transform coefficient occurred at each component.

Furthermore, according to the first embodiment, although the modeling parameter can be derived for each quantization block size as described above, there is a case in which quantization blocks of a 4×4 pixel block and an 8×8 pixel block are mixed depending on the encoding apparatus, so that values of the optimum quantization matrix are different depending on the quantization block size. In this case, optimum quantization matrices for each block size can be designed by calculating respectively a code amount R4 and an encoding distortion D4 for encoding with the 4×4 pixel block and a code amount R8 and an encoding distortion D8 for encoding with the 8×8 pixel block by using the optimum quantization matrix for each quantization block size, and approximating the modeling parameter by using Equations (7) to (16) with respect to the modeling parameter sets (R4, D4) and (R8, D8) corresponding to each block size. Although an example with the 4×4 pixel block and the 8×8 pixel block is explained above, the same goes for various pixel blocks such as a 16×16 pixel block and a 2×2 pixel block, or a 4×2 pixel block and a 4×4×2 pixel block.

Moreover, according to the first embodiment, the modeling parameter can be derived for each encoding mode. In a moving-image encoding, an intra-picture encoding in which the encoding is performed using the encoding frame only and an inter-picture encoding in which the encoding is performed using temporally preceding and following encoding frames can be used. Because each of the encoding method has a different prediction structure, a tendency of a prediction error occurred is considerably different; and therefore, it is often the case that the value of the optimum quantization matrix tends to be different. In this case, the modeling parameter can be approximated by calculating a code amount Rintra and an encoding distortion Dintra at the time of encoding by limiting to the intra-picture encoding and a code amount Rinter and an encoding distortion Dinter at the time of encoding by limiting to the inter-picture encoding and employing Equations (7) to (16) with respect to corresponding (Rintra, Dintra) and (Rinter, Dinter). With this mechanism, a quantization matrix appropriate for a property of each encoding frame can be designed.

An image encoding apparatus according to a second embodiment is explained below.

Figure 16:
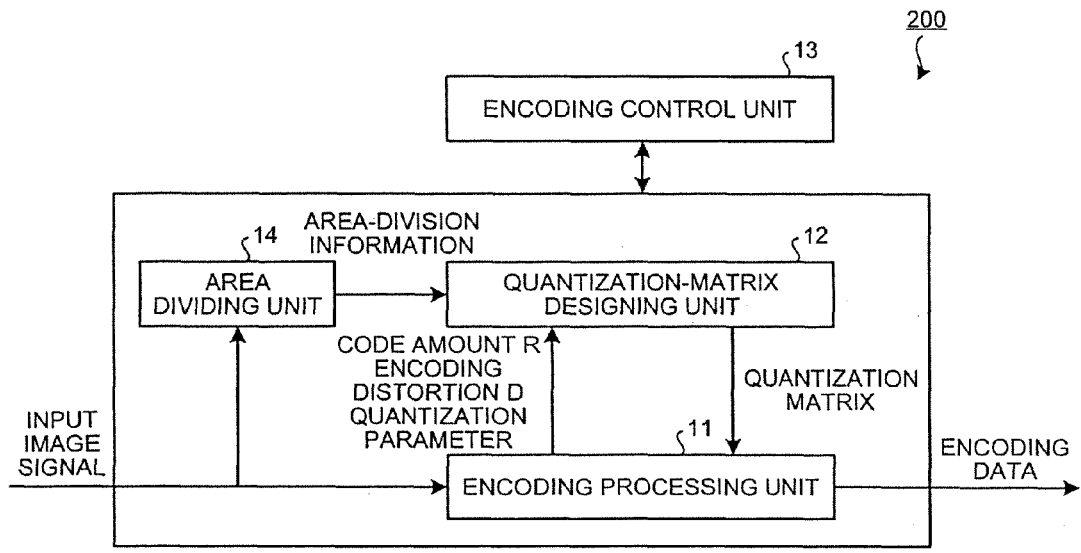
FIG. 16 is a block diagram illustrating a functional configuration of an image encoding apparatus according to a second embodiment of the present invention.

FIG. 16 is a block diagram illustrating a functional configuration of an image encoding apparatus 200 according to the second embodiment. As for a function unit that is different from the first embodiment, an area dividing unit 14 is added. In the same manner as the other function units, the CPU 1 controls each of the components according to a predetermined program stored in advance in the storing unit so that the area dividing unit 14 is generated in the RAM 3.

The area dividing unit 14 has a function of dividing the area in the encoding frame by using a feature amount of the input image signal. The quantization-matrix designing unit 12 designs the quantization matrix by using the code amount R and the encoding distortion D obtained from a tentative encoding by the encoding processing unit 11. Therefore, an optimum solution of the quantization matrix is different depending on a level of the encoding. By performing an area division before the encoding by using the feature amount corresponding to the level of the input image signal, the quantization matrix can be designed for each area.

Figure 17:
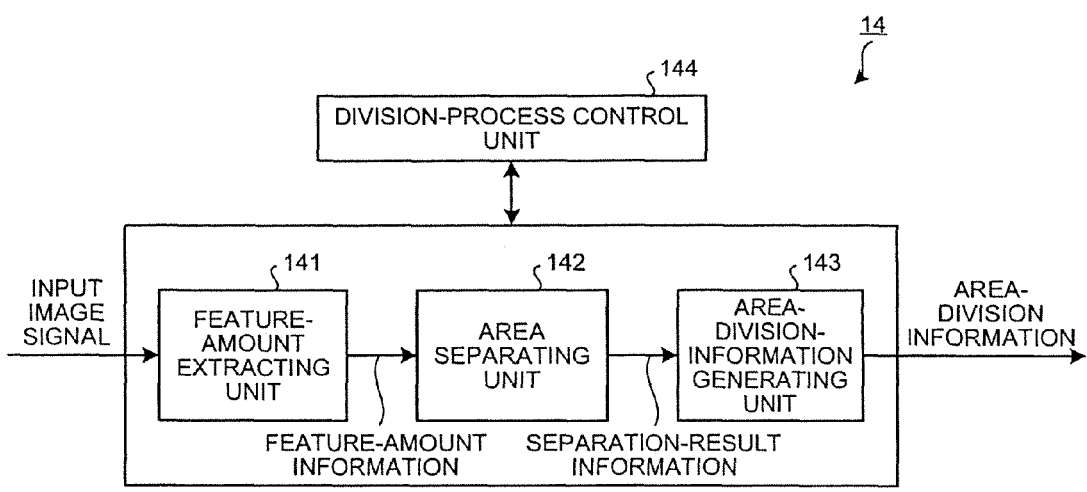
FIG. 17 is a block diagram illustrating a functional configuration of an area dividing unit shown in FIG. 16.

FIG. 17 is a block diagram illustrating a functional configuration of the area dividing unit 14. As shown in FIG. 17, the area dividing unit 14 includes a feature-amount extracting unit 141, an area separating unit 142, an area-division-information generating unit 143, and a division-process control unit 144.

The feature-amount extracting unit 141 calculates a signal activity for each 8×8 pixel block from a plurality of pixels constituting the input image signal. The signal activity means a variance of a luminance value in a block. As for an index indicating an area with a high encoding level, it is possible to use a level of the activity. Because the activity is high in an image area including a complex texture, it can be considered that the encoding level is high. On the other hand, because the activity is low in a flat image area, it can be considered that the encoding level is low. In this manner, the feature-amount extracting unit 141 calculates the activity for each 8×8 pixel block, and outputs the calculated activity to the area separating unit 142 as feature-amount information.

The area separating unit 142 divides the encoding frame into a plurality of areas by performing a threshold process of separating the feature-amount information input from the area separating unit 142 based on a predetermined threshold value. For instance, in a case of dividing the encoding frame into two areas, if the activity of Xth 8×8 pixel block in a raster scan order is taken as A(X) with respect to the encoding frame, it is separated as a class 1 if A(X) is larger than a threshold TH, and a class 2 if A(X) is smaller than the threshold TH. A separation result obtained in the above manner is output to the area-division-information generating unit 143 as separation-result information.

The area-division-information generating unit 143 generates area-division information required for designing the quantization matrix based on the separation-result information input from the area separating unit 142.

Figure 18A:
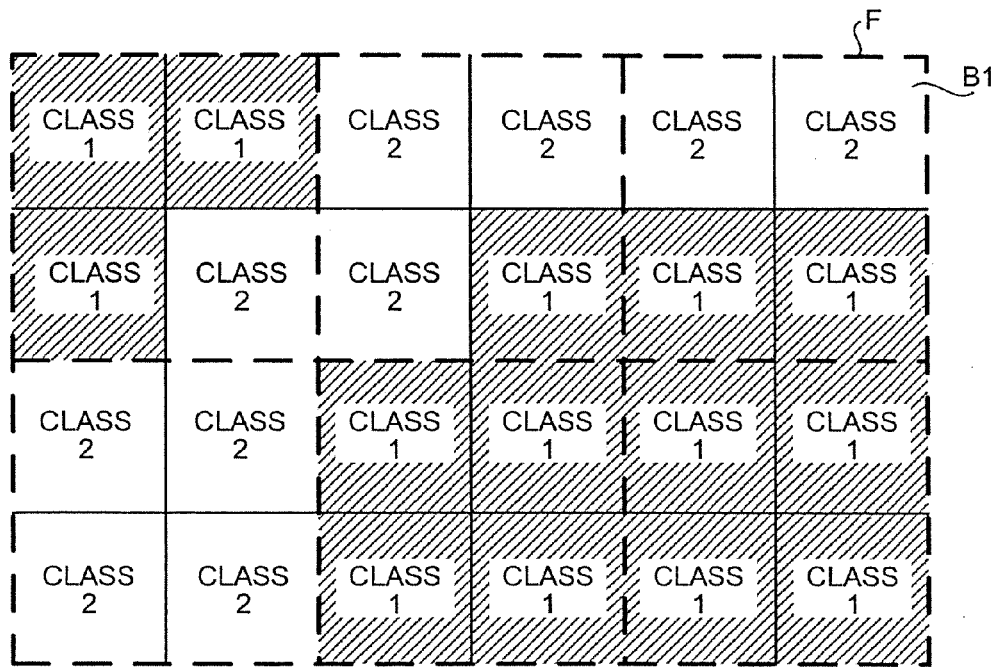
FIGS. 18A and 18B are schematic diagrams for explaining an area dividing process.

The generation of the area division information is explained below with reference to FIGS. 18A and 18B. FIG. 18A is a schematic diagram of an example of separation-result information. The division-process control unit 144 performs an overall control of operations of the function units included in the area dividing unit 14.

The generation of the area-division information is explained below with reference to FIGS. 18A and 18B. FIG. 18A is a schematic diagram for explaining an example of the separation-result information. In the example shown in FIG. 18A, an encoding frame F is constituted with 24 pieces of 8×8 pixel blocks B1. As shown in FIG. 18A, the blocks are separated into the class 1 and the class 2 by the area separating unit 142.

Figure 18B:
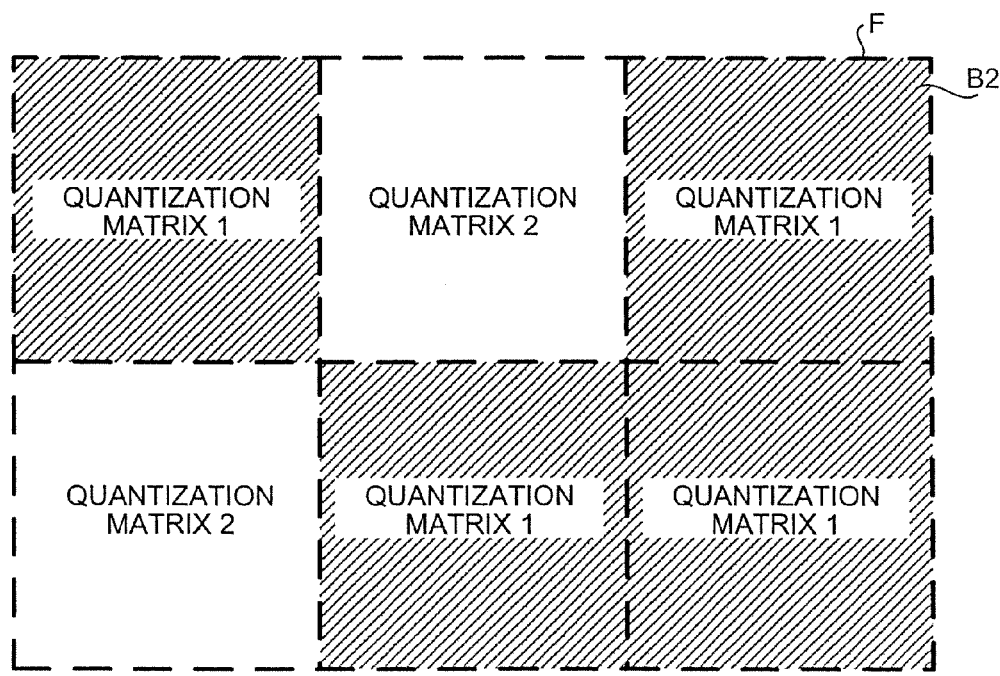

The area-division-information generating unit 143 converts the pixel blocks into an area B2 (quantization matrix 1 and quantization matrix 2) for every 16×16 pixels as shown in FIG. 18B, based on the separation-result information of four pixel blocks B1 shown in FIG. 18A. Specifically, the area-division-information generating unit 143 takes a decision by a majority based on the class to which each of the four pixel blocks B1 belongs, and sets the class of majority as an attribute of the area. In FIG. 18B, when the numbers of blocks belonging to the class 1 and the class 2 are same, it is set in such a manner that the corresponding area is taken as the class 1.

In this manner, the area dividing unit 14 generates quantization-matrix-division information shown in FIG. 18B as the area-division information, and outputs the generated area-division information to the quantization-matrix designing unit 12.

Upon receiving the area division information, the quantization-matrix designing unit 12 derives the quantization matrix based on the code amount R and the encoding distortion D input from the encoding processing unit 11, for each area indicated by the area-division information. These controls are governed by the encoding control unit 13, and it is configured that accumulations of the code amount R and the encoding distortion D are switched for every 16×16 pixel blocks.

As described above, according to the second embodiment, the image signal to be encoded (encoding frame) is divided into a plurality of areas, and the quantization matrix is obtained for each divided area, so that it is possible to design a quantization matrix more appropriate for the image signal. Therefore, the encoding efficiency can be improved.

Although the activity is calculated for every 8×8 pixel blocks according to the second embodiment, the present invention is not limited to this scheme. For instance, the pixel block size for the calculation can be set to a 4×4 pixel block, a 16×16 pixel block, an 8×16 pixel block, a 16×8 pixel block, for the like.

Furthermore, according to the second embodiment, although the activity that can be calculated as the variance of the input image is employed as the feature amount of the image, the present invention is not limited to this scheme. For instance, as other feature amount, any one of an intra-frame luminance distribution, an intra-frame color-difference distribution, an inter-frame difference value, and the like can be used. In addition, as a more complicated feature amount, any one of an inter-frame movement vector, intra-frame and inter frame transform coefficient distributions, intra-frame and inter-frame quantization error (encoding distortion) distributions, and the like can be used. In this case, a prediction process and a movement-vector search process, an orthogonal transform process, a quantization process, a dequantization process, and the like are actually required. However, because it is possible to perform a more accurate area division, the encoding efficiency can be improved.

An image encoding apparatus according to a third embodiment is explained below. The same reference numerals are assigned for the components same as the first embodiment, and explanations for such components are omitted.

Figure 19:
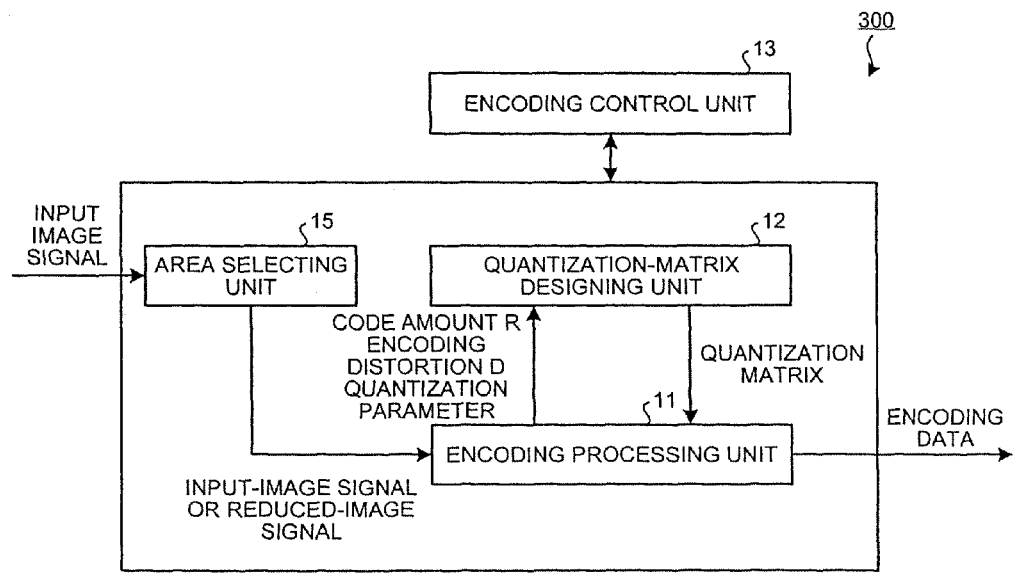
FIG. 19 is a block diagram illustrating a functional configuration of an image encoding apparatus according to a third embodiment of the present invention.

FIG. 19 is a block diagram illustrating a functional configuration of an image encoding apparatus 300 according to the third embodiment. As for a function unit that is different from the first embodiment, an area selecting unit 15 is added. In the same manner as the other function units, the CPU 1 controls each of the components according to a predetermined program stored in advance in the storing unit so that the area selecting unit 15 is generated in the RAM 3.

Unlike the first embodiment and the second embodiment, according to the third embodiment, the input image signal is configured to be input to the area selecting unit 15. The area selecting unit 15 has a function of selecting an image range to be used for designing the quantization matrix from the input image signal. Specifically, the area selecting unit 15 creates a reduced image by performing a down-sampling process with respect to the input image signal, to generate the quantization matrix effectively while reducing the processing cost required for the tentative encoding.

Figure 20:
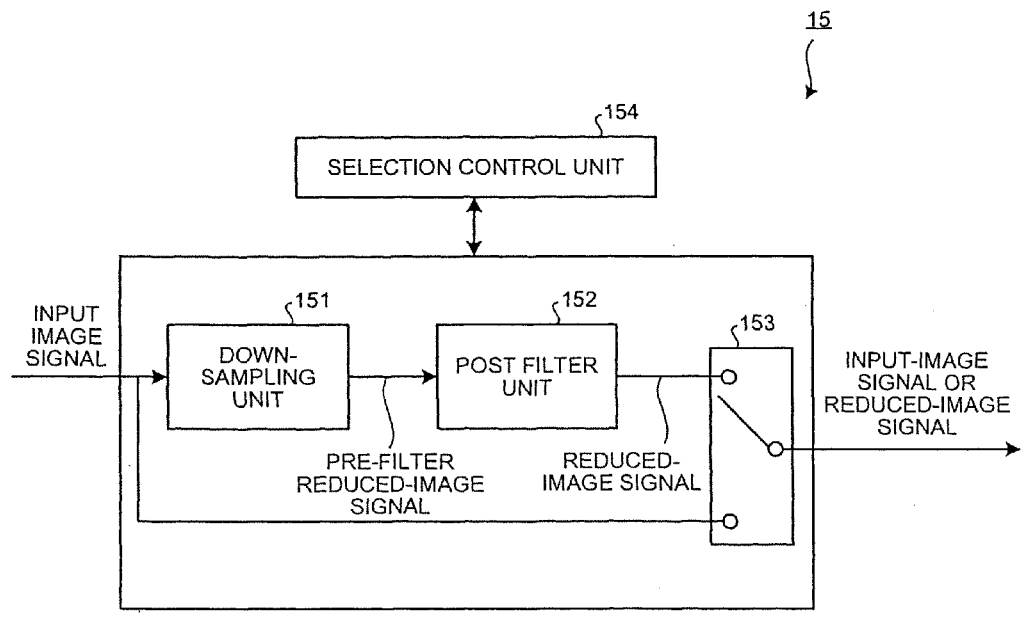
FIG. 20 is a block diagram illustrating a functional configuration of an area selecting unit shown in FIG. 19.

FIG. 20 is a block diagram illustrating a functional configuration of the area selecting unit 15. As shown in FIG. 20, the area selecting unit 15 includes a down-sampling unit 151, a post-filter unit 152, a switch 153, and a selection control unit 154.

Figure 21A:
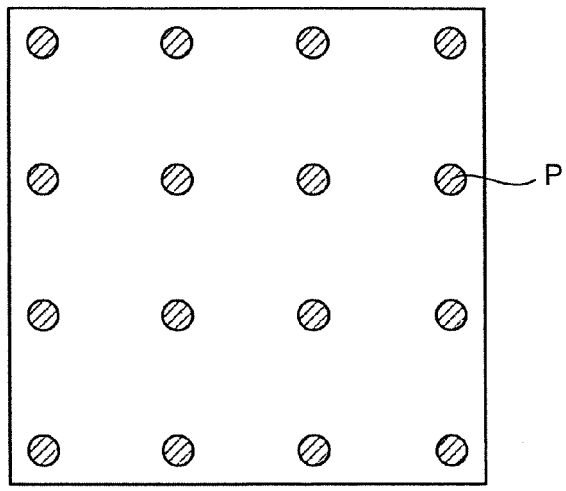
FIGS. 21A to 21C are schematic diagrams for explaining a down-sampling process.
Figure 21B:
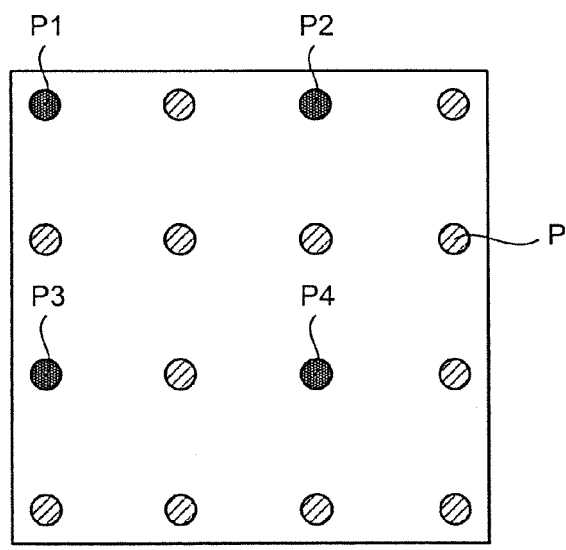
Figure 21C:
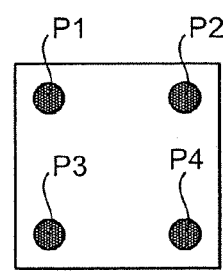

The down-sampling unit 151 reduces the image by performing a down-sampling process shown in FIGS. 21A to 21C on the input image signal. FIGS. 21A to 21C show the simplest down-sampling process. FIG. 21A is a schematic diagram of an input image signal represented with 4×4 pixels. The down-sampling unit 151 selects a plurality of pixels P included in the input image signal for every other pixel, and determines four pixels P1 to P4 shown in FIG. 21B. An image in which only the four pixels P1 to P4 are collected becomes a ¼ reduced image shown in FIG. 21C. This reduced image is output to the post-filter unit 152 as a pre-filter reduced image.

The post-filter unit 152 performs a correction of the pre-filter reduced image by using a smoothing filter, and outputs the corrected pre-filter reduced image to the switch 153 as a post-filter reduced image. In general, if the down sampling shown in FIG. 21B is performed, a discontinuity occurs at a sampling boundary, which noticeable as a ringing noise. The post-filter unit 152 performs a correction on the pre-filter reduced image to reduce the noise.

The switch 153 performs a switching operation at a timing controlled by the selection control unit 154. Specifically, the selection control unit 154 controls two phases of the image encoding apparatus 300. The first phase is a quantization-matrix design phase, and the second phase is an actual encoding phase. When the phase issued from the selection control unit 154 is the quantization-matrix design phase, the switch 153 makes a connection to an output terminal of the post-filter unit 152. On the other hand, when the phase issued from the selection control unit 154 is the actual encoding phase, the switch 153 is controlled so that the input image signal is directly output.

As describe above, according to the third embodiment, the switch 153 is controlled dynamically according to the phase of the image encoding apparatus 300. Therefore, because the quantization matrix can be designed using an image reduced through the down-sampling unit 151 and the post-filter unit 152 when designing the quantization matrix, and the encoding can be performed on the input image when performing the actual encoding, it is possible to greatly reduce a time for designing the quantization matrix.

Although the simple one-pixel skipping down-sampling method is explained according to the third embodiment, the present invention is not limited to this scheme. For instance, a sophisticated down sampling can be used according to the signal characteristic and the circuit characteristics. Furthermore, the reduced image is not necessarily limited to the ¼ reduced image, but a ½ reduced image or a ⅛ reduced image can be used as the reduced image. However, as the image size becomes smaller, a degradation of the encoding efficiency with respect to the input image signal can occur although the time required for designing the quantization matrix can be reduced. Therefore, it is important to perform a selection with a good balance between the processing cost and the encoding efficiency.

In addition, the type of the filter used in the post-filter unit 152 can be selected according to the corresponding down-sampling process. Although the simple smoothing filter is explained according to the third embodiment, the present invention is not limited to this scheme. For instance, an adaptive filter with a different tap length can be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An image encoding apparatus comprising:
an image acquiring unit that acquires an image signal;
a modeling-parameter setting unit that selects a selection parameter sequentially from among a plurality of parameters included in a modeling equation for deriving a quantization matrix, and sets a value of the selection parameter to a predetermined value;
a quantization-matrix calculating unit that calculates the quantization matrix by using the modeling equation for each time the selection parameter is set;
a tentative-encoding processing unit that performs a tentative encoding of the image signal by using the quantization matrix, and derives a quantization parameter representing a code amount, an encoding distortion, and a quantization scale;
an approximate-expression estimating unit that derives a first approximate expression approximating a relation between the code amount and the selection parameter and a second approximate expression approximating a relation between the encoding distortion and the selection parameter;
a code-amount-distortion-expression calculating unit that calculates code-amount-distortion relational expression representing a relation between the code amount and the encoding distortion by using the first approximate expression and the second approximate expression;
a target-code-amount calculating unit that calculates a target code amount or a target encoding distortion by using the code-amount-distortion relational expression and the quantization parameter;
a modeling-parameter calculating unit that calculates a value of the selection parameter corresponding to the target code amount by using the first approximate expression, or calculates a value of the selection parameter corresponding to the target encoding distortion by using the second approximate expression;
an optimized-quantization-matrix calculating unit that calculates an optimized quantization matrix for encoding the image signal based on the calculated value of the selection parameter and the modeling equation; and
a final-encoding processing unit that performs a final encoding of the image signal using the optimized quantization matrix;
wherein the approximate-expression estimating unit derives the first approximate expression and the second approximate expression in such a manner that each of a logarithm of the code amount and a logarithm of the encoding distortion is linearly approximated with respect to the selection parameter.

2. The apparatus according to claim 1, further comprising:
a feature-amount extracting unit that extracts a feature amount of a predetermined pixel block unit included in the image signal; and
an area dividing unit that divides the image signal into a plurality of areas based on the feature amount, wherein the quantization-matrix calculating unit calculates the quantization matrix for each of the divided areas.

3. The apparatus according to claim 2, wherein the feature-amount extracting unit uses as the feature amount at least one of luminance distribution, color-difference distribution and activity in the image signal, difference value and movement vector between image signals input in a row, transform coefficient distribution in the image signal, transform coefficient distribution between the image signals, and quantization error distribution between the image signals.

4. An image encoding method comprising:
acquiring, by a computer, an image signal;
selecting, by the computer, a selection parameter sequentially from among a plurality of parameters included in a modeling equation for deriving a quantization matrix, and setting a value of the selection parameter to a predetermined value;
calculating, by the computer, the quantization matrix by using the modeling equation for each time the selection parameter is set;
performing, by the computer, a tentative encoding of the image signal by using the quantization matrix, and deriving a quantization parameter representing a code amount, an encoding distortion, and a quantization scale;
deriving, by the computer, a first approximate expression approximating a relation between the code amount and the selection parameter and a second approximate expression approximating a relation between the encoding distortion and the selection parameter;
calculating, by the computer, code-amount-distortion relational expression representing a relation between the code amount and the encoding distortion by using the first approximate expression and the second approximate expression;
calculating, by the computer, a target code amount or a target encoding distortion by using the code-amount-distortion relational expression and the quantization parameter;
calculating, by the computer, a value of the selection parameter corresponding to the target code amount by using the first approximate expression, or calculating a value of the selection parameter corresponding to the target encoding distortion by using the second approximate expression;
calculating, by the computer, an optimized quantization matrix for encoding the image signal based on the calculated value of the selection parameter and the modeling equation; and
performing, by the computer, a final encoding of the image signal using the optimized quantization matrix;
wherein the first approximate expression and the second approximate expression are derived in such a manner that each of a logarithm of the code amount and a logarithm of the encoding distortion is linearly approximated with respect to the selection parameter, in the approximate-expression estimating.

5. The method according to claim 4, further comprising:
extracting, by the computer, a feature amount of a predetermined pixel block unit included in the image signal; and
dividing, by the computer, the image signal into a plurality of areas based on the feature amount, wherein
the quantization matrix is calculated for each of the divided areas in the quantization-matrix calculating.

6. The method according to claim 5, wherein at least one of luminance distribution, color-difference distribution and activity in the image signal, difference value and movement vector between image signals input in a row, transform coefficient distribution in the image signal, transform coefficient distribution between the image signals, and quantization error distribution between the image signals is used as the feature amount, in the feature-amount extracting.

* * * * *